US008543410B2

(12) United States Patent  (10) Patent No.: US 8,543,410 B2
Sinclair et al.  (45) Date of Patent: Sep. 24, 2013

(54) METHOD AND SYSTEM PROVIDING ADVICE AND SERVICES TO CONSUMERS

(75) Inventors: Trevor Sinclair, Melbourne (AU); Paul J. David, Melbourne (AU); Andrew Sherman, Melbourne (AU); Paul Quirk, Melbourne (AU)

(73) Assignee: SVX Group Pty Limited, Hawthorn, Victoria (AU)

( * ) Notice: Subject to any disclaimer, the term of this patent is extended or adjusted under 35 U.S.C. 154(b) by 0 days.

(21) Appl. No.: 13/462,225

(22) Filed: May 2, 2012

(65) Prior Publication Data

US 2012/0304308 A1  Nov. 29, 2012

Related U.S. Application Data

(63) Continuation of application No. 12/206,539, filed on Sep. 8, 2008, now abandoned, which is a continuation of application No. 10/471,896, filed on Sep. 12, 2003, now abandoned.

(30) Foreign Application Priority Data

Mar. 14, 2001 (AU) ...................................... PR3726

(51) Int. Cl.
    *G06Q 10/00* (2012.01)
(52) U.S. Cl.
    USPC ............... 705/1.1; 705/35; 705/36; 705/36 R; 705/36 T; 705/44
(58) Field of Classification Search
    USPC ...................... 705/1.1, 35, 36 R, 36 T, 36, 44
    See application file for complete search history.

(56) References Cited

U.S. PATENT DOCUMENTS

| 6,092,199 | A | 7/2000 | Dutcher et al. |
| 6,101,607 | A | 8/2000 | Bachand et al. |
| 6,154,732 | A * | 11/2000 | Tarbox ........................ 705/36 R |

(Continued)

FOREIGN PATENT DOCUMENTS

| WO | WO 90/12464 | 10/1990 |
| WO | WO 98/13783 | 4/1998 |

(Continued)

OTHER PUBLICATIONS

Office Communication in connection with prosecution of NZ528797, dated Dec. 10, 2003.
Office Communication in connection with prosecution of GB0323953.0, dated Jun. 30, 2004.

(Continued)

*Primary Examiner* — Gabrielle McCormick
(74) *Attorney, Agent, or Firm* — Goodwin Procter LLP

(57) ABSTRACT

The present invention provides a method and system for providing advice and/or services to a consumer including the secure electronic storage of rich private personal data preferably held on behalf of persons entities. The system provides the applications, processes, controls and data management services to collect, transfer, store and selectively retrieve data necessary to perform specified planning and decision support activities that have been integrated with the secure data store. The invention provides for the data owner and authorized persons to gain access to accessible data to undertake permitted tasks. These tasks may include receiving data, or undertaking planning, or such other tasks as prescribed. In an embodiment, the system limits access to applications to authorized persons and requires permissions from the owner in order to manage data privacy standards. The system allows the owner to provide and revoke access to applications and tracks and records all access events.

29 Claims, 14 Drawing Sheets

(56) References Cited

U.S. PATENT DOCUMENTS

| | | | | |
|---|---|---|---|---|
| 6,269,369 | B1* | 7/2001 | Robertson | 1/1 |
| 6,625,734 | B1* | 9/2003 | Marvit et al. | 726/28 |
| 2001/0011250 | A1* | 8/2001 | Paltenghe et al. | 705/41 |
| 2002/0019808 | A1* | 2/2002 | Sharma | 705/40 |

FOREIGN PATENT DOCUMENTS

| | | |
|---|---|---|
| WO | WO 99/23591 | 5/1999 |
| WO | WO 99/63886 | 12/1999 |
| WO | WO 00/26823 | 5/2000 |

OTHER PUBLICATIONS

Office Communication in connection with prosecution of GB0323953.0, dated Jan. 19, 2005.
John Craig, "Millenial motivation: This New Year's is special, so why not go for broke and improve your lot with some hard-nosed financial resolutions?" *National Post* (Don Mills, Ontario [National Ed.], Jan. 1, 2000, p. C.4FRO).
Vickie Hampton, "The Right Way to Hire Financial Help" *Advisor Today* vol. 96, Issue 1, p. 92 (Washington, Jan. 2001).

* cited by examiner

METHOD AND SYSTEM PROVIDING ADVICE AND SERVICES TO CONSUMERS

CROSS REFERENCE TO RELATED APPLICATIONS

This application is a continuation patent application of U.S. patent Ser. No. 12/206,539 filed Sep. 8, 2008, which, in turn, is a continuation patent application of U.S. patent Ser. No. 11/471,896 filed Sep. 12, 2003, both of which are incorporated herein by reference.

TECHNICAL FIELD

This invention relates generally to a method and system for providing advice and/or services to consumers and includes the storage and sharing of personal data of a user in a computer system such that the personal data is secure and not easily accessible to others with whom the personal data is not intended to be shared. The invention is suited to various applications where consumers, or trusted entities acting on behalf of consumers, permit efficient access to personal data by others who legitimately require that information or with whom the consumer wishes to share that personal data. In particular, the invention relates to a system and method for consumers to effectively share personal data and in doing so obtain advice based upon the personal data that has been made available to advisers.

BACKGROUND ART

Databases for the storage of information have been known for some time. However, databases are not well known for the storage and efficient dissemination of personal information to third parties who are provided permission to access that personal information.

Generally, there is a significant level of community concern regarding the security of personal information stored electronically in databases. In particular, breaches of privacy with respect to personal information stored in databases operated and maintained by government agencies and others act to undermine the trust of members of the community.

Security measures such as public key encryption have been introduced in an attempt to improve the level of security with respect to the handling of information that is stored and accessed electronically. However, these developments have generally only been implemented with respect to entire documents or to provide access to entire databases.

Adviser relationships have existed since mankind first sought the advice of a trusted family member, associate or other trusted individual to assist a person make a decision or plan to achieve an outcome.

The success of the advice given depends upon the ability of the individual seeking advice to identify and communicate a complete view of their relevant history, current circumstances and future plans, and upon the trusted individual's ability to identify and make use of that information to arrive at a recommended course of action and to develop a strategy to reach the individual's goal.

Of course, this depends upon the complexity of the individual's goal and the information required, the individual's ability to selectively communicate all the information to enable the trusted individual (or trusted individuals working in collaboration), the ability of the trusted individual to get access to this information when alternatives are being considered, the professional skills required of the trusted individual to provide advice to meet that goal, and the individual's commitment to the trusted individual's recommendation(s).

Whilst the best possible advice is desired from a trusted individual and accurate personal data is divulged for this reason, people are generally not inclined to provide unfettered access to an adviser with respect to all their personal data. Accordingly, most people seek to restrict divulging personal data to only those necessary details for an adviser to provide the relevant advice.

As a result, there is a balance between divulging relevant personal data to an adviser to enable them to provide relevant, practical and effective advice and the personal desire to retain personal information private and confidential.

The general concern about keeping personal information private and protected has led to many countries adopting strict regulatory controls with respect to the use and management of an individual's personal data. On the other hand, with the advent of increased reliance upon advisers for a range of needs, it is becoming increasingly common for advisers to adduce evidence of a satisfactory level of probity and awareness of an individual's personal situation such that they can justify their advice as relevant and appropriate considering the personal circumstances of the individual seeking advice.

The situation is further complicated when a person requires advice from a range of advisers who each require access to different aspects of the individual's personal data. In certain circumstances, significant inefficiencies can be avoided if advisers are able to collaborate with respect to the individual advice they are providing.

Presently, in situations where a consumer requires advice from a range of advisers, they provide their relevant personal data to each adviser individually. In most instances, there is a substantial repetition of the data provided which is usually necessary since individual advisers rarely collaborate with respect to advice for a particular consumer. As a result, each adviser will usually keep a record of the personal data provided by consumer and retain that data for future reference. As the advice provided by an adviser is necessarily reliant upon the consumers personal data, advisers effectively become the owner of the record of personal data provided to and kept by them as they need to keep such data in the event that they are subsequently confronted with an allegation of negligence or some form of misconduct. In these instances, advisers rely upon the personal data that they keep to enable them to defend their consumer's action and/or the advice provided to the consumer.

Therefore, with prior arrangements, there is significant inefficiency experienced by a consumer when they seek advice from a range of advice providers. This inefficiency is particularly noticeable when a consumer requires advice from multiple advisers who need to collaborate in order to advice the consumer.

Further, with prior arrangements, it is not possible for consumers to retain ownership of their data and obtain advice without providing copies of their personal data to an adviser whilst at the same time satisfying the requirements of advisers to be able to justify or defend the advice provided.

Accordingly, it is an object of the present invention to provide a method and system of providing advice to a consumer that mitigates the inefficiencies associated with previously known methods and systems.

It is another object of the invention to provide a method and system of providing advice to a consumer that enables a consumer to retain ownership of and access their personal data and avoid providing copies of same to advisers for the purpose of obtaining advice.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", should be understood to mean the inclusion of a stated element, integer or step, or group of elements, integers or steps, but not the exclusion of any other element, integer or step, or group of elements, integers or steps.

SUMMARY OF THE INVENTION

In one aspect, the present invention provides a method for providing advice and/or services to a consumer the method including the steps of:

the consumer storing personal data and documents in a secure repository connected to a data communications network;

the consumer specifying items of personal data in the secure repository that are to be accessible to at least one authorized advice provider;

an authorized advice provider accessing the consumer's available items of personal data across the data communications network upon provision of necessary authentication;

the advice provider analyzing the items of personal data to determine the advice for the consumer;

the advice provider depositing information into the consumer's secure repository across the data communications network, said information representing the advice provided to the consumer; and the consumer accessing the information deposited into their secure repository to review the advice.

In another aspect, the present invention provides a method for providing advice and/or services to a consumer the method including the steps of:

the consumer authorizing a trusted entity to store the personal data of the consumer into a secure repository connected to a data communications network and to manage the release of that data;

the consumer and/or trusted entity specifying items of personal data in the secure repository that are to be accessible to at least one authorized advice provider;

an authorized advice provider accessing the consumers available items of personal data across the data communications network upon provision of necessary authentication and when executing computer instructions code for accessing the personal data that has been pre-approved by the trusted entity; and the advice provider analyzing the items of personal data to determine the advice for the consumer.

In a preferred embodiment of the method of the invention, the method includes the step of the consumer specifying a plurality of advice providers that can access an item of personal data. In this embodiment, the step of advice providers accessing at least one item of personal data of a consumer includes the execution of at least one segment of computer instruction code. The computer instruction code may execute functions with respect to the items of personal data and provide the results of those functions to advice providers. Further, these functions may be executed and provide results to advice providers without revealing the actual personal data of the consumer to the advice provider.

It is expected that consumers will pre-approve the computer instruction code that will be permitted to access the personal data of the consumer. Of course, in the event that a consumer appoints a trusted entity to store, maintain and manage their secure repository of personal data, the trusted entity would most likely be authorized by the consumer to approve computer instruction code that, when executed, accesses the stored items of personal data owned by the consumer.

Once information is deposited into a consumers secure repository, the information representing the advice provided to a consumer by an advice provider, the consumer and/or trusted entity may authorize other advice providers to access that previously supplied advice.

As consumers are now generally more reliant upon advice from other others than ever before, it is not unusual for service industries to establish codes of conduct for members of those industries in relation to the advice they provide. In some instances, regulatory controls have been established and legislation enacted to penalize advice providers that do not display a requisite level of care and attention with respect to the advice they provide. One particular aspect of the duty of care required by an advice provider is that they ensure that they have adequate data pertaining to a consumers circumstances and an understanding of a consumers goals, attitudes to risk and similar values. Accordingly, in a preferred embodiment of the invention, the secure repository includes items of data representing the values and/or attitudes of the consumer, the consumer's personal goals that they intend to achieve over a specified period of time, the consumer's goals as prioritized by the consumer, the consumer's preferred outcomes over a specified period of time and the preferred outcomes as prioritized by the consumer. Of course, with this type of data available to an advice provider, the provider can access and determine their advice based upon this data.

In a particularly preferred embodiment, the consumer appoints a principal adviser to act on their behalf and authorizes that principal adviser to execute various transactions on behalf of the consumer. This enables the consumer to relieve themselves of the burden of managing their affairs and arranging and authorizing other advice providers as and when required and considering the advice provided and resolving any difficulties or queries about advice that is deposited into the consumers secure repository.

In an embodiment of the invention, the consumer and/or principal adviser authorizes a plurality of advice providers to access relevant personal data of the consumer to enable the plurality of advice providers to provide relevant advice to the consumer having regard to at least one of the consumer's values, attitudes, personal goals and/or preferred outcomes. Enabling multiple advisers to access the personal data of a consumer increases the efficiency of the process of obtaining advice from multiple advisers as compared with prior systems and methods. Further, where the trusted entity and/or principal adviser retain the personal data for and on behalf of a consumer, the consumer is able to prevent their personal data from being replicated throughout a number of systems as is currently the practice.

In a particularly preferred embodiment, the method includes the step of the recordal of each instance of one or more of the following: instances of access to a consumer's personal items of data in their secure repository; instances of the depositing of information into a consumer's secure repository; or instances of changes to a consumer's personal items of data in their secure repository.

Of course, having recorded all instances of events as listed above, the method also preferably includes reporting the instances. This type of report could be produced by either the consumer, the consumer's principal adviser and/or the trusted entity.

According to another aspect, the present invention provides a system for providing advice and/or services to a consumer, the system including:

a secure repository connected to a data communications network for the storage of personal items of data of a consumer;

a means enabling the consumer to specify those items of personal data in the secure repository which are to be made accessible to an authorized advice provider;

a means enabling the consumer to identify the advice provider or a class of advice providers to whom access will be provided for those specified items of personal data;

a means for authenticating the identity of an advice provider; and a means for enabling authenticated authorized advice providers to access the specified items of personal data of the consumer for which the advice provider has been identified as having permission to access and a means enabling an advice provider to execute computer instruction code that obtains items of personal data from the consumers secure repository and analyses the items of personal data to generate information that represents advice for the consumer, the computer instruction code also enabling the advice provider to deposit said information into the consumers secure repository for subsequent access by the consumer.

In another aspect, the present invention provides a system for providing advice and/or services to a consumer, the system including:

a secure repository connected to a data communications network controlled by a trusted entity to store personal items of data for consumers;

a means enabling consumers to specify those items of personal data in the secure repository that are to be made accessible to an authorized advice provider;

means enabling the consumers to identify the advice provider or a class of advice providers to whom access will be provided for those specified items for personal data:

means for authenticating the identity of an advice provider; and means for enabling authenticated authorized advice providers to access the specified items of personal data of consumers for which the advice provider has been identified as having permission to access.

Preferably, the system of the present invention provides, in addition to the secure repository, a plurality of approved software applications, wherein each of the plurality of applications provides a specific function such as:

enabling each of the consumers to store personal data in the secure repository;

enabling each of the consumers to specify those items of personal data in the secure repository which are to be made accessible to an authorized advice provider;

enabling each of the consumers to identify the advice provider or the class of advice providers to whom access is to be provided for those specified items of personal data;

authenticating the identity of an advice provider; and enabling authenticated authorized advice providers to access the specified items of personal data of the consumer for which the advice provider has been identified as having permission to access.

In some embodiments of the present invention, such computer software applications may access personal data stored in the secure repository in order to provide a response to a particular query of an authenticated authorized advice provider, without revealing an actual value of the accessed personal data.

The system of present invention provides the consumer with a secure electronic storage system for their personal private data. In preferred embodiments of the invention, each of the consumer can access their personal data at any time by use of a network browser or personal portal connected to the system of the present invention. Preferably, the system applications present the data in a manageable form to facilitate easy retrieval and re-ordering of personal data in order to perform specific tasks such as planning and decision making in relation to key life events.

The system of the present invention further enables each of the consumers to securely link personal information with key advice or service providers. That is, the present invention enables the advisers or service providers of the consumer to securely access the personal data of the consumer as prescribed by the consumer, via a data communication network such as the Internet. The system of the present invention provides a consumer and the consumer's service providers with applications to facilitate convenient access of the personal data of the consumer, thereby improving the efficiency of the data collection processes of advice or service providers. Further, the system of the present invention provides a secure repository in which the user may store personal data such as accounting records, financial records, health records, professional data and the like. Consequently, the system of the present invention enables data from disparate sources to be pooled into a single secure repository, reducing the requirement for duplication of records and facilitating efficient provision of that personal data to authorized advice and/or service providers identified by the consumer. The present system therefore empowers users to uniquely store their personal data in a secure repository, and to establish access permissions to advice providers of their choice, such as accountants or other service providers. As such, since consumers commonly deal with many such professional service providers, the present system avoids the need to duplicate data gathering efforts and the need for the user to actively provide the same data repeatedly to the various professional service providers with whom they deal. The system may further provide a plurality of applications facilitating the storage and access of the personal data in the secure repository.

For the purposes of this specification, the term "personal data" may refer to the data that is considered personal, or private, to either an individual or an organization such as a small business. For example, the consumer may be a small business or organization.

The selection of items of personal data for sharing may be effected by various methods. Preferably, the selection of items of personal data for sharing is effected by use of a template, the template including at least one pre-defined list of personal data items that may be shared with an advice provider or another consumer, or class of advice providers or consumers. The pre-defined template may be amended a consumer or principal adviser in order to amend the items of personal data that may be shared with an advice provider or another consumer identified by that template. For example, a consumer may prefer to share personal financial data with finance professionals without sharing that information with anyone else, such as insurance company personnel.

The selection of personal data for purposes of sharing may also be effected by use of a filter within the technology and activated by either the consumer or a professional adviser wherein a set of conditions satisfied by personal data of the consumer is shared with advice providers or a class of advice providers. In instances where there is a substantial amount of personal data amended by a consumer, it may be more convenient to select items of personal data for sharing by the establishment of a "sharing rule" or criteria as compared with requiring a consumer to provide a specific sharing indication for each and every item of personal data they own.

In an embodiment, a consumer grants permission to advice providers or other consumers to share items of personal data by enabling those advice providers or consumers to access the template or filter that the consumer has defined for those providers or consumers. In this instance, the authentication of the advice provider to gain access to the template or filter may act as the authority to gain access to the items of personal data of the consumer as provided by the template or filter.

Irrespective of the method used by an advice provider or consumer to gain access to personal data items of a consumer, the method preferably includes the steps of recording all instances of actual access of the consumers personal data to generate an audit trail. The record of instances of access may be included in a report that is supplied to the consumer each and every instance an attempt to access personal data occurs. Alternatively, a report of all instances of access of the consumers personal data may be provided on a regular basis (eg monthly).

Templates or filters may define the particular items of personal data that a consumer wishes to share but may also include other restrictions or conditions relating to the sharing of personal data. For example, a template or filter may operate only to allow access to personal data for a limited period of time, or may only allow access for a limited number of times.

Whilst templates or filters primarily limit access to specific items of personal data intended to be shared by a consumer, they may also perform functions on the underlying personal data of a consumer thus providing to an advice provider using a template or filter, information derived from one or more of the underlying items of personal data of the consumer. Additionally, a template or filter may devolve information into data such that it may be presented to advice providers, such as a service provider, in a more appropriate form. The devolution of personal information into data thus provides greater flexibility with respect to the form of the personal data required by advice providers.

In a preferred embodiment, advice providers may contribute to the store of advice for a consumer as a result of effecting their own services in relation to the personal data of the consumer to which they have been granted access. For example, a financial planner may develop a plan of investments for a consumer based upon their personal data and may deposit into the consumer's secure repository, information relating to an investment plan. The template provided to the advice provider, namely a financial planner, may also provide them with the ability to deposit additional items of information into the consumer's repository. Templates or filters may be developed for specific purposes and be capable of only a single use.

In a particularly preferred embodiment, an advice provider transfers a software program into the secure repository of a consumer which uses the data to which the advice provider has been granted access as input to the software program. In this instance, the output of the software program also resides in the secure repository and is thus provided to the consumer. The output of the software program may, for example, provide advice to the consumer or may provide a progress report with respect to some combination of items of personal data. The software program may provide an alert or warning of an impending condition or circumstance that requires some form of intervention in order to avoid. The software program may also provide details regarding the form of intervention required or choices in relation to the available types of intervention that may avoid the condition or circumstance from developing. The execution of the software program within the secure repository of the consumer provides an assurance to the consumer that their personal data is not transferred out of their secure repository at any time.

The software program made available may also provide recommendations regarding further actions to be performed or further data that should be collected or analyzed in order to provide decision support.

The secure repository of items of personal data of consumers may be entrusted to a trusted entity. In a preferred embodiment, the trusted entity may be engaged to create links between personal data items of the consumer in order to enable other users to efficiently access required personal data items of the consumer. In such an embodiment, the linking of items of data enables an advice provider to efficiently perform an analysis of the consumer's relevant data and to provide advice accordingly.

Irrespective of the source or operation of the secure repository, access to data within the repository preferably requires the use of a digital security key. The digital security key is preferably supplied by an advice provider or other consumer at the time the requests for access to items of personal data are made, whether the access is by way of a template or not. The provision of access may be determined in a challenge/response manner.

In a particularly preferred embodiment, the secure repository is connected to a data communications network thereby enabling all other permitted advisers connected to that network to gain access to the personal data of a consumer. Preferably, the repository is connected to the Internet.

In an embodiment, a number of consumers may be provided with concurrent access to the personal data of a first consumer. Simultaneously, the first consumer may be provided with concurrent access to the personal data of those other consumers. In this instance, a community of consumers is effectively formed wherein the secure repositories of the group of consumers are aggregated to form the community. This provides for the effective sharing of information between that community of consumers and enables advice and service providers to gather collective data from the group and analyze that data.

Various advantages of the present invention other than those already described will be apparent from the description of a preferred embodiment of the invention.

BRIEF DESCRIPTION OF DRAWINGS

An example of the invention will now be described with reference to the accompanying drawings in which.

BEST MODE OF INVENTION

Figure 1:
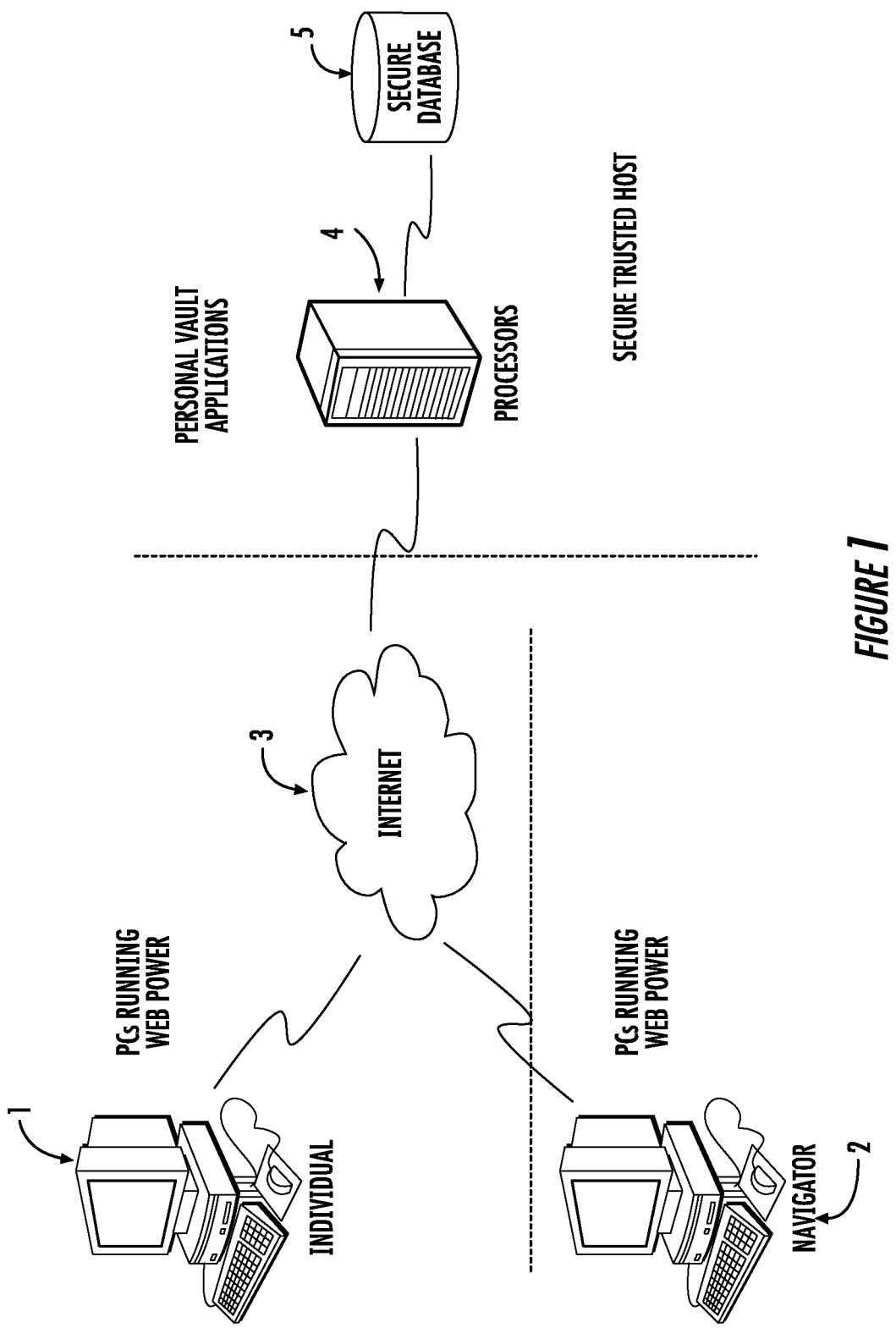
FIG. 1 illustrates an architecture of the present invention.

The present invention is preferably implemented in an application architecture as depicted in FIG. 1. In a particularly preferred embodiment, a consumer or individual 1, representing either a natural person or an enterprise, interacts with a trusted entity or Navigator 2, which may be either an individual or business that provides specialized advice or services, or a tool delivered through a software application or other device to record and use private information to assist the consumer or individual to meet their goals.

In a particularly preferred embodiment, a Navigator applies for and is granted permission to gain access to a secure repository or "Personal Vault" 4 this is managed by a trusted entity, and to either use or install task-specific applications within the secure or repository "vault". These applications will depend upon the importation of the individual's (or business') private data to determine a tailored solution or course of action to reach an individual's goal.

In the course of establishing the Navigator relationship and identifying the individual's needs, in a preferred embodiment the individual's private and sensitive information will be delivered by the individual 1 to the Navigator 2. In a particularly preferred embodiment delivery occurs electronically and the information is sent, with appropriate access controls, via the respective Web browsers of the participants through the Internet 3, and directed to the information processors 4 of a secure trusted entity. The secure trusted entity establishes and populates a secure database 5 as a repository for the individual's information, and holds that information in trust for the individual 1. Information required to populate the secure database 5 may be collected from the individual, from the Navigator 2 based upon services previously supplied, or from third parties authorized by the individual to supply information relevant to the Navigator's task.

Once the secure database 5 has been established through the secure trusted entity, the Navigator 2 can then interact with the data held therein by making use of computer software applications held within the secure trusted entity's central processor 4. New results of activities undertaken between individual 1 and Navigator 2 are recorded and transmitted via the respective browsers of the individual 1 and Navigator 2 through the Internet 3, and to the individual's secure database 5. Results of progress or shortcomings against intended outcomes are recorded and analyzed by the respective application held within the trusted entity's processor 4 and reported back via the Internet 3 to the respective pc-based browsers of both the Navigator 2 and individual 1.

Figure 2:
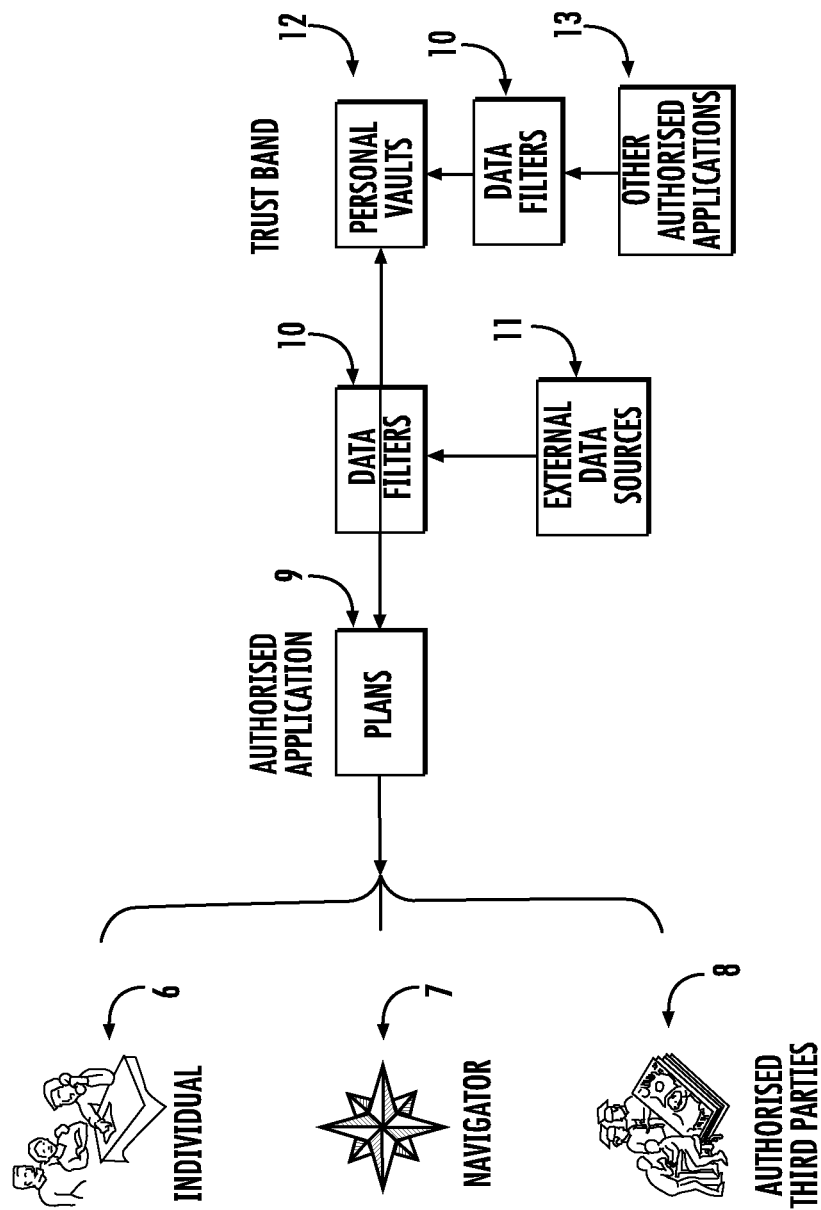
FIG. 2 illustrates a system model of a system according to the present invention.

FIG. 2 illustrates a system model of a system according to the present invention. Navigators, third parties and other participants develop applications 9 and 13, respectively, to meet the goals of individuals, such as wealth planning or health management. These applications will be reviewed by and approved or rejected, and the necessary data filters 10 identified that are required to restrict access to only necessary and approved information. Approved applications are registered with the Personal Vault 12 held by the trusted entity.

The individual 6 interacts with an authorized person or service provider, or Navigator 7 to establish and work from a task-specific plan. In the course of gathering information to establish the plan, the individual's personal data, held in trust, is sourced from the Navigator 7, authorized third parties 8 and other external data sources 11. The authorized application 9 or 13 delivers the information through data filters 10 that determine the right to use and need to use the personal data intended to realize the individual's stated goals contained within their plan.

The progressive achievement of plan outcomes is reported by the authorized application 9 and monitored by both the Navigator and individual to determine if and when interim milestones have been achieved, and to determine what steps are necessary to meet the intended goal.

The essence of the present invention is to provide a method and system to enable consumers, individuals or businesses to manage key elements of their affairs by following a process based upon an integrated and secure exchange of personal data with advisers. Such a data exchange between consumers, individuals and advisers is provided by establishing a secure storage for personal data and managing the release and integrated distribution of personal data between advisers. In a preferred embodiment, the present invention includes a reliable store of data pertaining to the individual or company, and integrates that information with each interaction occurring with an approved adviser. The individual or company that is the owner of the information remains in control and authorizes the release of information to advisers as appropriate. Further, when a trusted entity acts on behalf of a consumer or individual and manages the secure storage of personal data and controls the access to that data by external entities such as advisers; the consumer or individual is relieved of the burden of this task. The storage and management of personal data is a non-trivial task especially if the trusted entity bears the responsibility of managing the secure store of data to ensure that all regulatory requirements are satisfied with respect to the control of authorized access to the data.

In a particularly preferred embodiment, the trusted entity establishes uniform protocols for authentication of advisers for access to personal data and similar protocols for the supply and storage of information from advice providers into a consumer or individuals secure repository.

Individuals are gaining access to a massive storehouse of often conflicting health, financial and other information through the Internet. But information without intelligence is useless. Within each industry, there is likely to be the need for a specialist resource that will act as an intermediary for the information owner to support complex decision-making that requires expert resources, processes and/or mediation. Such a resource will guide the individual or company through the nuances of establishing a wealth creation, health management or other plan and then gathering, storing and releasing specialized information to achieve planned outcomes. For the purposes of this specification, the primary advisory role, sometimes referred to as the principal adviser, is termed the 'Navigator', and the interaction between the individual or company and Navigator to provide and integrate information into a plan is referred to as the "Value Exchange".

In a particularly preferred embodiment, the Navigator will be an individual or business, but the invention recognizes that the Navigator may equally be a computer application or other interactive resource that the individual or company may use to reach their goal.

While the Navigator is likely to be a trained expert able help the individual make complex choices, for the purposes of this invention the Navigator may equally be a software program that collects, integrates, analyses and reports the individual's information, databases used to resolve a need, or published evaluators of alternatives.

A particular advantage of the present invention is that the individual or company is regarded as the "owner" of the data, and retains ownership although selected data is made accessible for use by outside advisers.

The Value Exchange builds a consistent store of information on behalf of the individual or company as each interaction with an adviser occurs, and makes that information available at the critical moment where decision support is required. This may be initiated either by the individual or by one of their nominated advisers. The individual or company that is the owner of the information remains in control and authorizes the release of information to interested parties as appropriate.

The Navigator and workflow processes enable an adviser to take personal data and enrich it to suit specific needs, such as by creating a health or financial outcome diagnostic leading to a course of health management or investment strategy. The system and method of the present invention may also be used to facilitate the prescription of medication or a loan application.

Across many industry sectors, there is continuous exchange of information about individuals or companies as they go about separate but related processes across the span of the industry. Often the information has substantially common elements, but it is rarely shared or re-used efficiently because each part of the industry has different systems, processes and traditions. To be useful, this information needs to reach all intended audiences participating in the delivery of a service or outcome. The value of information will be determined by the quality of that information as defined by the user—considering such elements as accuracy, currency, propensity for customization, interactivity, relevance, security and other measures. The reach available to a consumer or individual will be determined by the number of authorized participants sharing the individuals personal data.

Potential applications of the present invention exist in the health industry services, where an individual can find that they are providing the same information many times as they progress through various stages of care. In a particular embodiment, the present invention permits an individual anticipating major surgery to have all operative and post-operative care with the surgeon and supporting medical communities and medications scheduled and all details communicated early in the consultative process.

Similar potential applications exist in the financial services industry, where an individual or company may have many interested parties that need to know relevant financial data pertaining to an individual and each has slightly different requirements. The situation is compounded where data needs to be gathered from more than one industry. In a particular embodiment of the present invention, a trusted individual or trusted entity can source a range of personal data including beneficiaries' and their contact details, estate asset and liability data and life insurance details when executing a will.

The person or company as owner of the data can use a system and method according to the present invention to improve the efficiency of obtaining advice as data may be collected and updated only once to serve a variety of tasks. This efficiency is shared by the Navigator, who, with consent, has access to a source of data upon which to provide the best advice and plan for outcomes with greater certainty.

The information management system illustrated in FIGS. 3 to 8 illustrate the processes through which the information owner and their communities establish the right to access private records, the processes for creating the Personal Vault and assigning specific access controls, activities related to using the information contained in the Personal Vault to help the information owner to reach planned objectives, and processes for management of the Personal Vault.

The high-level process steps associated with the invention include, step 1000 which represents those activities completed for registering Navigators and Third Party communities with an independent controlling authority, referred to as the "Personal Vault Authority", to obtain a secure access Community key and be ready to interact with Vault Owners' records, when authorized by the Vault Owner to do so. Step 2000 represents the processes through which individuals or companies work with Navigators to understand the benefits of a Personal Vault, and presents activities for clients to register with the Personal Vault Authority to get a secure access Owner's key and to create a Vault Owner's active Vault ready to populate with data. Step 3000 represents the processes by which Vault Owners will interact with the Personal Vault Authority to assign Vault access and management controls and enter details of participating Navigators and/or Third Party data suppliers, to provide for their interaction with the Owner's record, and to load their source data. Step 4000 represents those activities by which Vault Owners work with Navigators to understand the need for a Plan to achieve a stated objective, to undertake a needs analysis based upon the Owner's source records, and to load a Navigator-specific decision tree planning template to produce a customized plan. Step 5000 represents those activities by which Vault Owners work with Navigators to complete planned decision tree steps, with the measurement of performance against targets leading to the attainment of milestones, after which the Navigator establishes and manages further activities to achieve planned outcomes. Step 6000 represents those activities by which all parties manage their respective interfaces with the individual's Personal Vault, including periodic and on-demand refreshment of source data, provision for correcting or annotating a record, revising Vault management permissions, and terminating or archiving records.

Figure 3:
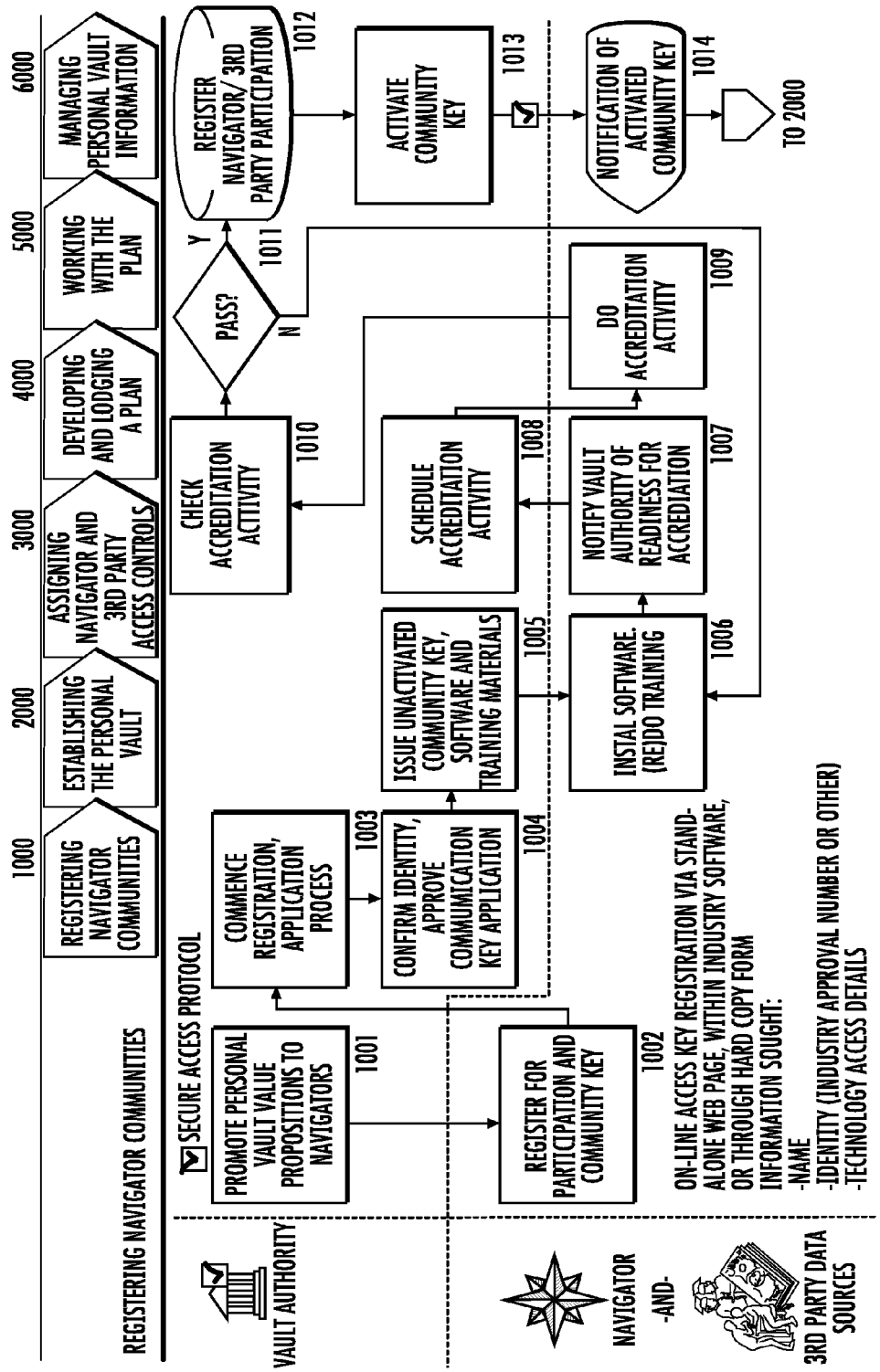
FIG. 3 depicts the flow and processing of information within the high-level process step of registering Navigator communities.

FIG. 3 illustrates the processes by which Navigators and Third Party communities register with an independent controlling authority, referred to as the "Personal Vault Authority" or "Vault Authority", to get a secure access Community key and be ready to interact with Vault Owners' records, when authorized by the Vault Owner to do so. In a particularly preferred embodiment, the Navigator will be an individual, but the invention recognizes that the Navigator may equally be a specialized diagnostic computer application or other interactive resource that the individual or company may use to reach their goal. Where the Navigator is other than human, the Navigator application will have undergone compliance reviews and accredited approval in a manner similar to that outlined in the steps below prior to its implementation.

At Step 1001, the Navigators and associated advice providers, referred to below as "applicants", become aware of the existence of the Personal Vault service through various marketing communications and promotional efforts undertaken by the Personal Vault Authority and other interested parties.

At Step 1002, the applicant registers their interest in interacting with their clients' records contained in the Personal Vault. In a preferred embodiment, registration will occur using a Vault Authority-sponsored website and its secure online application routine, using registration routines embedded within industry-specific software, or through a hard copy form completed and returned to the Vault Authority. Information contained in the application will include the applicant's name and contact details, their identity details (normally comprising an industry-specific approval number determined by the industry's licensing or controlling authority, or "reference source"), and details of the technology being used to access the Personal Vault, so that the appropriate key interface may be delivered. Where the applicant does not have a formally authenticated industry-specific approval number, the applicant must provide sufficient reference source details to the Vault Authority to prove their identity.

At Step 1003, the Vault Authority acknowledges receipt of the application and at Step 1004 confirms the details of the application with the reference sources provided on the application. Where all details are confirmed as correct, the Vault Authority approves the application. If details contained in the application are not sufficient to confirm the applicant's identity, the Vault Authority rejects the application and asks the applicant to re-apply or provide additional information.

At Step 1005, and after the application has been approved, the Vault Authority issues the applicant with an inactivated Personal Vault Community access key, software for installation, and instructional materials.

Steps 1006 through 1008 refer to the steps through which the applicant installs the access key software and refers to the instructional materials to understand how to interact with a client's private data as contained in their Personal Vault. The applicant installs the software and completes the training at Step 1006, and at Step 1007 contacts the Vault Authority to indicate they are ready to be tested for accreditation. The Vault Authority schedules the accreditation at Step 1008 and at Steps 1009 and 1010 reviews the applicant's ability to work with the Personal Vault in the approved manner. If the applicant passes accreditation at Step 1011, the Vault Authority registers the applicant at Step 1012 as an authorized participant, and activates the Community key at Step 1013, as issued earlier at Step 1005. The applicant is notified of acceptance, in a preferred embodiment, by e-mail at Step 1014. If the applicant fails the accreditation review at Step 1011, the applicant must undergo further training and another accreditation review at Steps 1006 through 1011.

Figure 4:
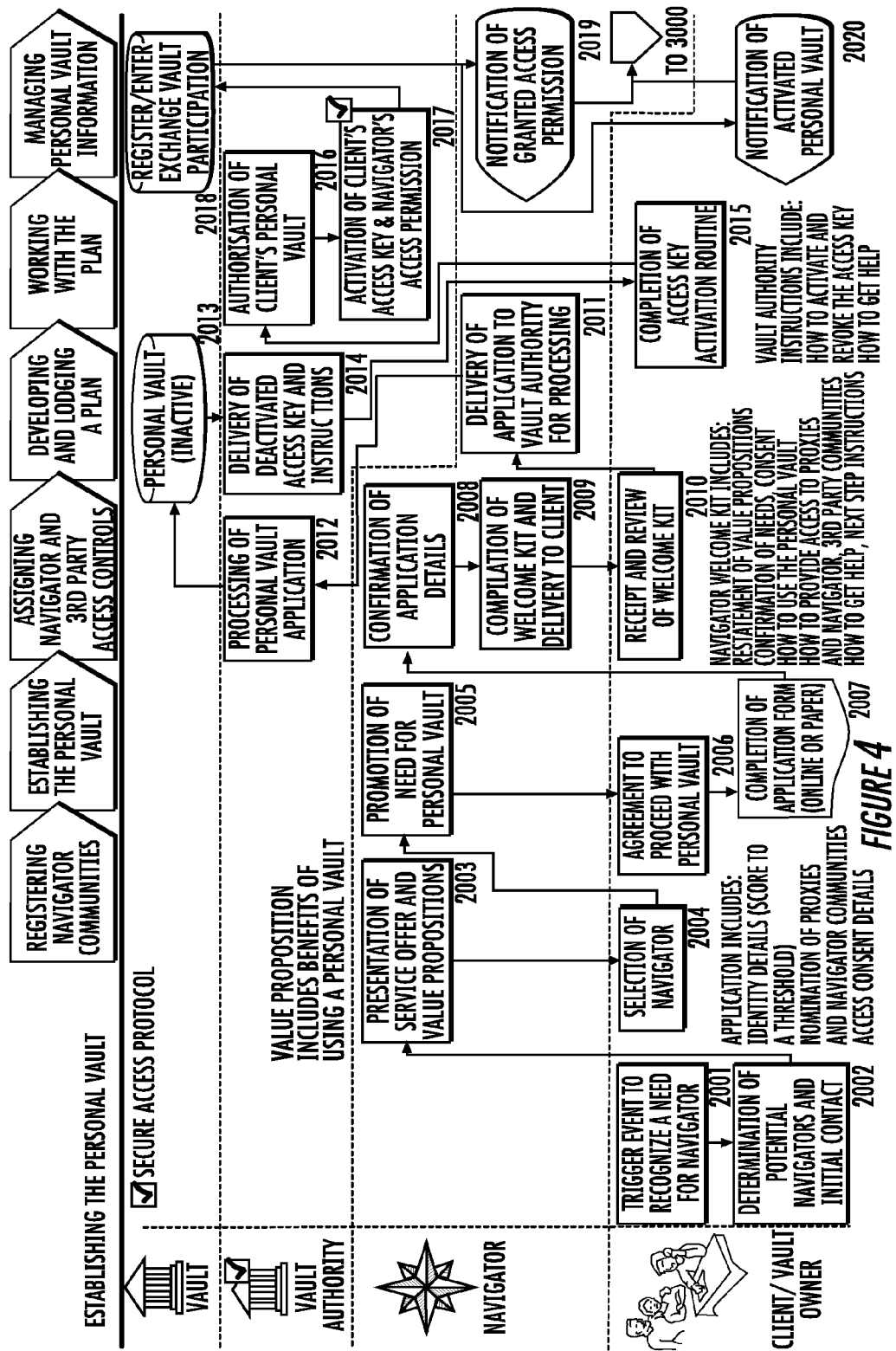
FIG. 4 depicts the flow and processing of information within the high-level process step of establishing a personal vault.

FIG. 4 illustrates the processes through which consumers, individuals or companies, referred to below as "clients" or "users" work with approved Navigators to understand the need for a Personal Vault, and presents activities for clients to register with the Personal Vault Authority to get a secure access Owner's key and to create a Vault Owner's active Vault ready to populate with data.

At Step 2001, a "trigger event" makes a client aware that an activity must be completed and that expert help is required. For example, such an activity may be awareness of a need to plan for retirement, to lose weight or to manage the business' cash flow performance.

At Step 2002, if the client does not have a specialist adviser, they will determine a selection of potential advisers, or "Navigators", that may be capable of helping to resolve their objective and will select their preferred Navigator. The client considers the service offer and value propositions made by prospective Navigators (either human or otherwise) at Step 2003.

An integral part of the Navigator's value proposition will be the benefits for establishing and interacting with a Personal Vault as part of a complete and integrated service offer. On this basis and for other reasons, the client selects their preferred Navigator at Step 2004. If this has not been completed in sufficient detail as part of the presentation of value propositions, the Navigator promotes the need for a Personal Vault with their client at Step 2005.

If the proposition to create a vault is acceptable to the client at Step 2006, the client completes an application form at Step 2007. The application form is necessary to establish the identity of the client as owner of the information to be contained in their Personal Vault, and to establish an access mechanism embodied in a secure access key. The application form, at a minimum, will include collection of identity details, ideally with each detail bearing a point score based upon their level of security and where an acceptable score meets or exceeds a threshold value. The form will also provide for the nomination of proxies who may act upon the client's behalf and will provide the proxy's identity details (as above). The application form will also provide for details of the nominated Navigator and other known third party participants, and provide for conditions of access and consent to interact with the client's private information. Access details provided in this way will be confirmed upon establishment of the Vault, and will be modifiable by the client at any time (see FIG. 5).

The Navigator, on behalf of the Vault Authority and acting as instructed as part of the Navigator accreditation process (at Steps 1006-1011), will confirm the client's application details at Step 2008. Once confirmed, the Navigator compiles and delivers a Welcome Kit to the client at Step 2010. At a minimum, the Kit will restate the value propositions surrounding creation of the Personal Vault, confirm the client's expressed needs and designated consent, present instructions for using the Personal Vault, how to provide additional access to Navigator communities, how to get further help and details of next steps in the vault establishment process.

The Navigator delivers the completed client vault application form to the Vault Authority for processing at Step 2011, and the Vault Authority processes the application at Step 2012. An outcome of this step will be the establishment of the client's Personal Vault at Step 2013. At this stage, and until access protocols have been initiated, the vault is dormant and inactive. The Vault Authority contacts the client by mail and confirms establishment of their vault, and delivers a deactivated access key, with activation and deactivation instructions, at Step 2014.

At Step 2015, the client receives the vault establishment information, and follows the instructions to activate their access key. As part of the activation routine, at Step 2016, the Vault Authority authorizes and activates the client's Personal Vault and then activates the client's access key, including activation of access permissions by nominated Navigator communities, at Step 2017. The activated vault is ready to populate with information at Step 2018.

Once the client's Personal Vault has been activated, both the client and nominated Navigator communities are notified at Steps 2019 and 2020. In a preferred embodiment, this notification occurs by e-mail or other electronic means.

Figure 5:
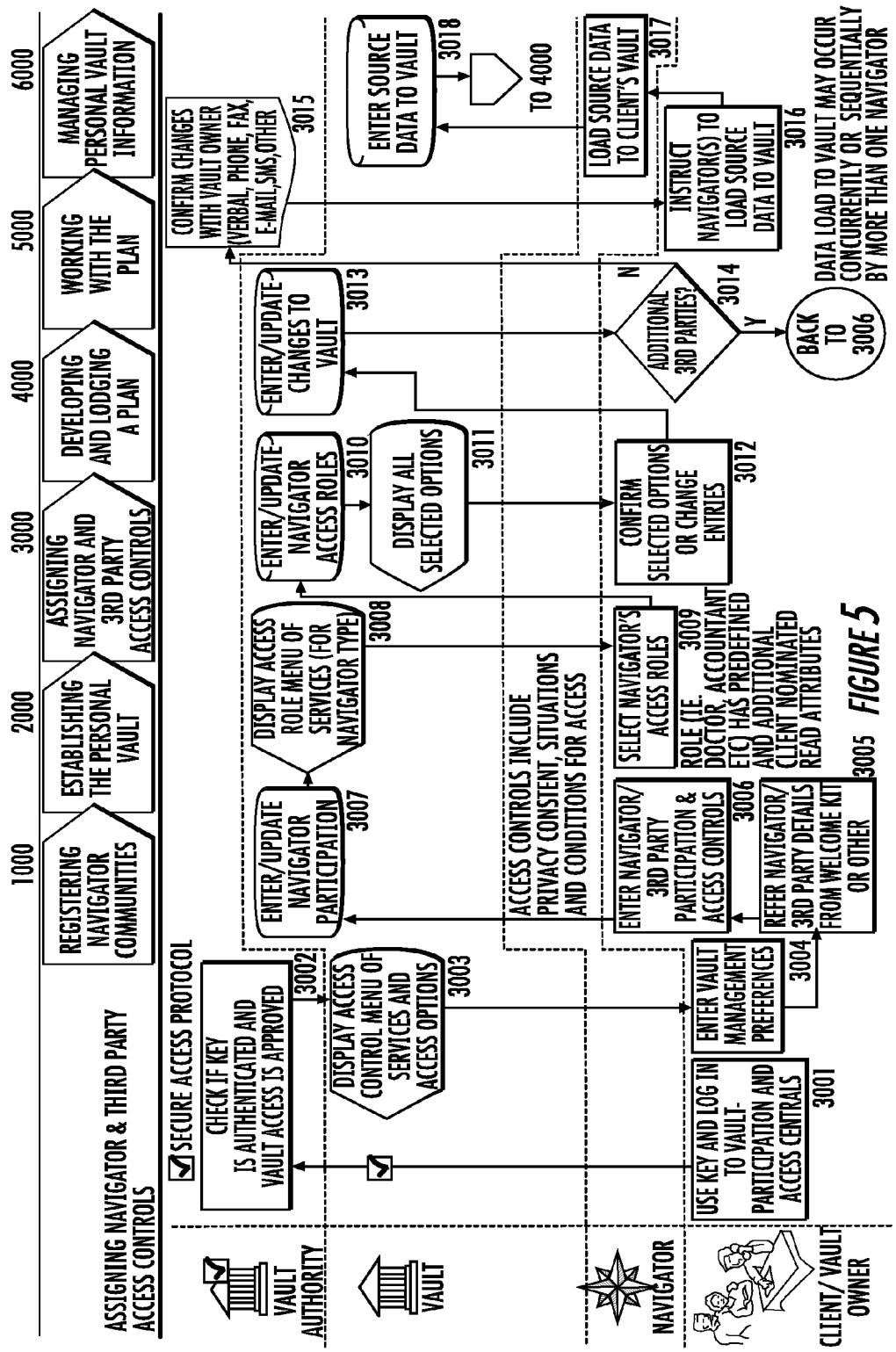
FIG. 5 depicts the flow and processing of information within the high-level process step of assigning Navigator and third party access controls.

FIG. 5 illustrates the processes by which Vault Owners will interact with the Personal Vault Authority to assign Vault access and management controls and enter or change details of participating Navigators and/or Third Party data suppliers, to provide for their interaction with the Owner's record, and to load their source data.

At Step 3001 the client uses their activated access key and personal computer to log in and enter their vault. At Step 3002 attempted access will be recognized and validated by the Vault Authority or other nominated access security provider, and if approved, and in a particularly preferred embodiment, at Step 3003 the client's computer will display an opening menu screen for the vault, confirming the client's identity and offering a series of hierarchical menus. At Step 3004 the client will select the menu item for entering and changing preferences for vault management.

At Step 3005 the client refers to the identity details of their Navigators and third parties as contained in the Navigator's welcome kit, delivered at Step 2010, and enters their details at Step 3006.

An automated routine recognizes the client's Navigator and the relevant role (Accountant, doctor, etc.) and links them to access and management controls within the vault at Step 3007. The access conditions tailored to specific roles are displayed on the client's personal computer at Step 3008, selected by the client at Step 3009, and communicated to and recorded by the Personal Vault at Step 3010.

Once selected, at Step 3011 the client's personal computer all nominated participants and selected access roles, for the client's reference. If approved, the client accepts all changes at Step 3012, and changes are updated in the Personal Vault at Step 3013.

The process is repeated for all additional Navigator and participating third parties, at Step 3014, and returns to Step 3006. At Step 3015, the Vault Authority confirms to the client all nominated Navigators, third parties and associated access controls.

Once the Personal Vault has been established, activated and all participants given the appropriate levels of access and authentication, the vault is ready to be populated with the client's data and used by all nominated participants. The client instructs their Navigator to load their source data to the client's vault at Step 3016, which is done at Step 3017 and recorded in the client's vault at Step 3018.

Such access controls will activate privacy consent and nominate situations and conditions covering access to the client's vault.

Figure 6:
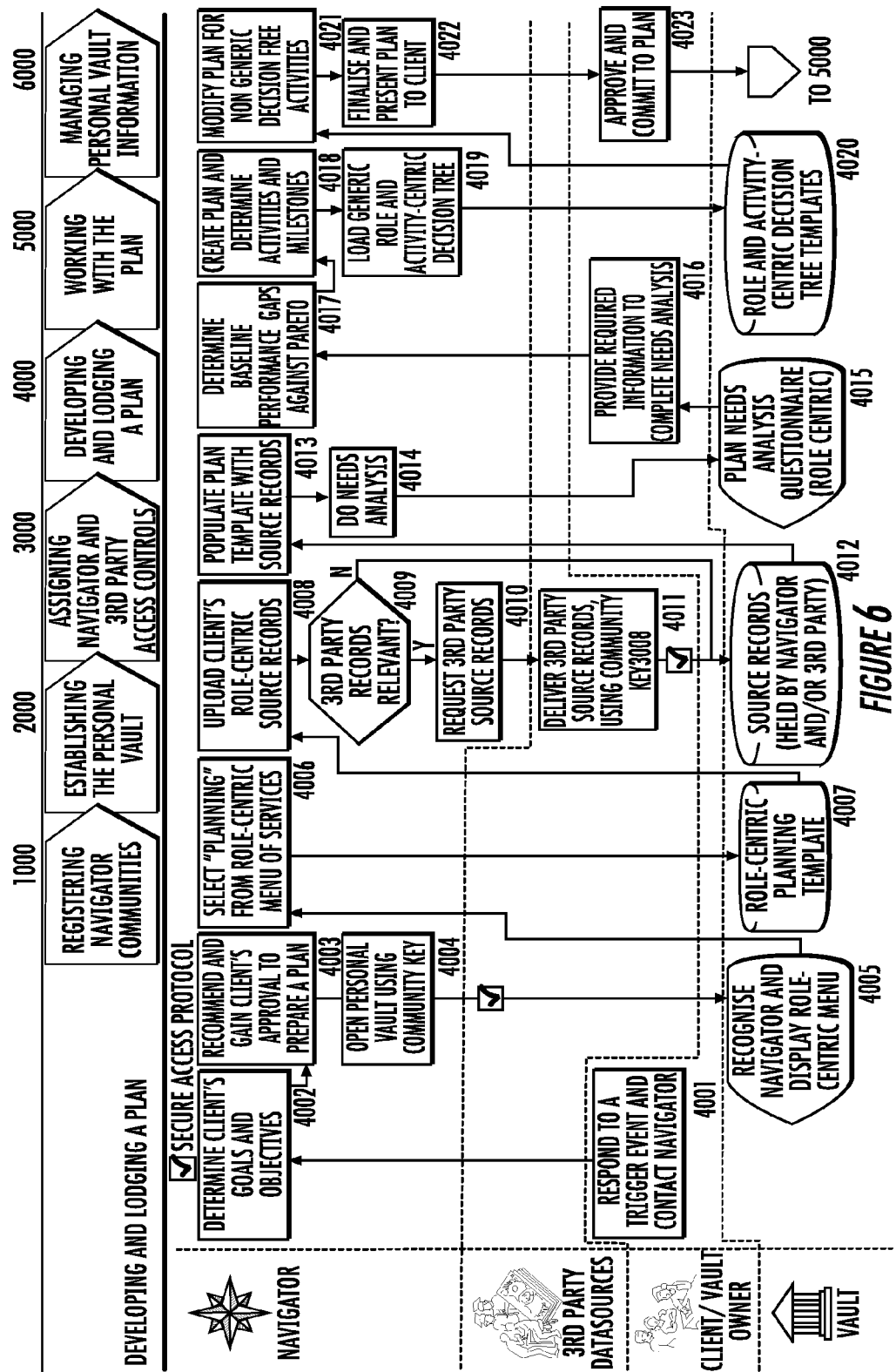
FIG. 6 depicts the flow and processing of information within the high-level process step of developing and lodging a plan.

FIG. 6 illustrates those activities by which Vault Owners work with Navigators to understand the need for a Plan to achieve a stated objective, to undertake a needs analysis based upon the Owner's source records, and to load a Navigator-specific decision tree planning template to produce a customized plan.

At Step 4001, the client responds to a trigger event and contacts their Navigator. This may be an extension of the reason for contact established at Step 2001, or it may relate to a new trigger event.

The client meets with the Navigator at Step 4002 and together they determine the client's goals and objectives (weight loss, retirement planning, etc.). At Step 4003 the Navigator will commonly recommend the creation of a plan to reach the client's goals and will secure their permission to do so.

In a particularly preferred embodiment, role-specific planning tools and templates will be developed by industry specialists; resulting best practice models that will be integrated within the Personal Vault data processing protocols and will interact with and draw from client data contained in the client's vault.

At Step 4004 the Navigator uses their Community key to open the client's Personal Vault. The vault recognizes the Navigator and their role and displays the relevant role-centric opening menu of services at Step 4005. The Navigator selects the "planning" service from the menu at Step 4006, and the vault returns a planning template tailored to the Navigator's specific role at Step 4007.

The Navigator refers to the planning template and uploads all relevant role-centric client records at Step 4008, drawing from the client's vault at Step 4012. If the template requires additional 3rd party information, this information is sought and delivered at Steps 4009 through 4011.

Once all available client records have been sourced, the respective template is populated with information at Step 4013. The Navigator then completes a client needs analysis (at Step 4014) by referring to a role-centric needs analysis questionnaire delivered by the respective template contained in the vault (Step 4015), and by information provided from the client during direct discussions (Step 4016).

Based upon the information provided, at Step 4017 the Navigator assesses the client's performance in key areas against Pareto expectations, representing the range of measures that would be expected for that individual (with respect to age, sex or other characteristics) or business segment (industry, scale, etc.). The Navigator then creates a Plan to achieve the desired target at Step 4018, and determines the activities and milestones required to reach the desired target.

Incorporated with the planning tools linked to the Personal Vault are activity-centric decision trees. As the client performs activities within their personalized plan, the path taken to reach their objective is determined by responses provided to questions posed by the Navigator and by the measurable results obtained when completing certain tasks. Completing scheduled activities eventually leads the client to a critical juncture, or "gate". At that point the client cannot proceed until their Navigator reviews their performance and directs them down the next decision tree path. This process is repeated until the client reaches their intended goals. The decision tree model is first used by the invention at Step 4019, and is illustrated on FIG. 7, Step 5023.

At Step 4019 the Navigator loads the relevant role- (i.e. doctor) and activity-centric (weight loss) decision tree template to the plan, drawn from the vault (Step 4020).

As a final plan preparation step, the Navigator modifies the plan for non-generic decision tree activities at Step 4021.

The Navigator now finalizes and presents the tailored plan to the client at Step 4022, and the client approves the plan at Step 4023.

Figure 7:
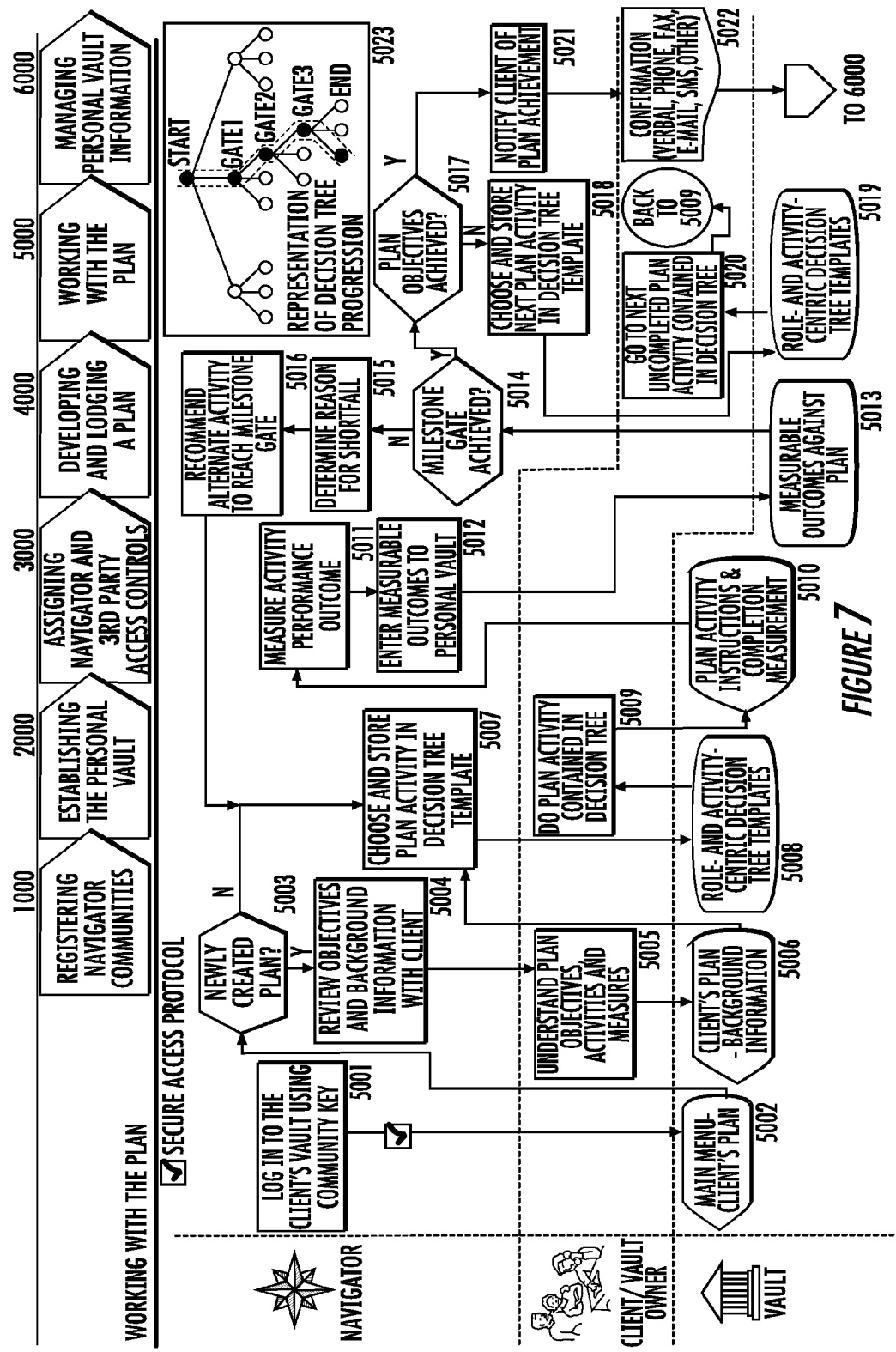
FIG. 7 depicts the flow and processing of information within the high-level process step of working with the plan.

FIG. 7 illustrates those activities by which clients work with Navigators to complete planned decision tree steps, with the measurement of performance against targets leading to the attainment of gated milestones, after which the Navigator establishes and manages further activities to achieve planned outcomes.

At Step 5001 the Navigator uses their Community key to enter their client's vault, and review their progress against plan. The vault displays a role-centric main menu at Step 5002, presenting the client's plan.

If a newly created plan (Step 5003) the Navigator meets with the client and reviews their objectives and background information at Step 5004. As a result of this meeting, at Step 5005 the client understands their plan objectives, the activities to be undertaken and the measures of success required. This background information is displayed on the client's personal computer through their vault at Step 5006.

As defined above, at Step 4019 and illustrated at Step 5023, activity-centric decision trees are incorporated within the planning tools linked to the Personal Vault. The Navigator will commence each major planning activity by choosing and storing a client's plan activity in the decision tree template, at Step 5007, and referred to in the vault at Step 5008.

Under the direction of the Navigator, the client does the first (or next) plan activity contained within the decision tree template (5009). Completion of the activity will be supported through instructions and information displayed on the client's personal computer, at Step 5010. Provision is also made in the invention for the Navigator to measure and record the client's indicators of actual performance to planned Pareto targets, at Steps 5011 and 5012 respectively, and for the information to be recorded in the client's Personal Vault at Step 5013.

The Navigator monitors the client's results contained in their vault and determines if a milestone gate has been achieved (at Step 5014). If a milestone gate has been achieved, the Navigator directs the client to the next activity to reach their goal. If there is a shortfall in achieving the milestone, the Navigator determines the reason for this at Step 5015, and recommends at Step 5016 an alternate course of action to reach the milestone gate.

The Navigator monitors progress to the achievement of the client's goal, after progressing through all decision tree branches. If a gate has been achieved but the plan goal has not (Step 5017), at Step 5018 the Navigator chooses and stores the next plan activity in the client's vault, selecting from a range of options in the decision tree template (Step 5019). The Navigator then instructs the client to proceed to the next uncompleted plan activity specified in the decision tree template (Step 5020).

If and when the client achieves their ultimate plan objective, at Step 5021 the Navigator notifies the client of their achievement, confirming the result during a visit or by electronic means at Step 5022.

Figure 8:
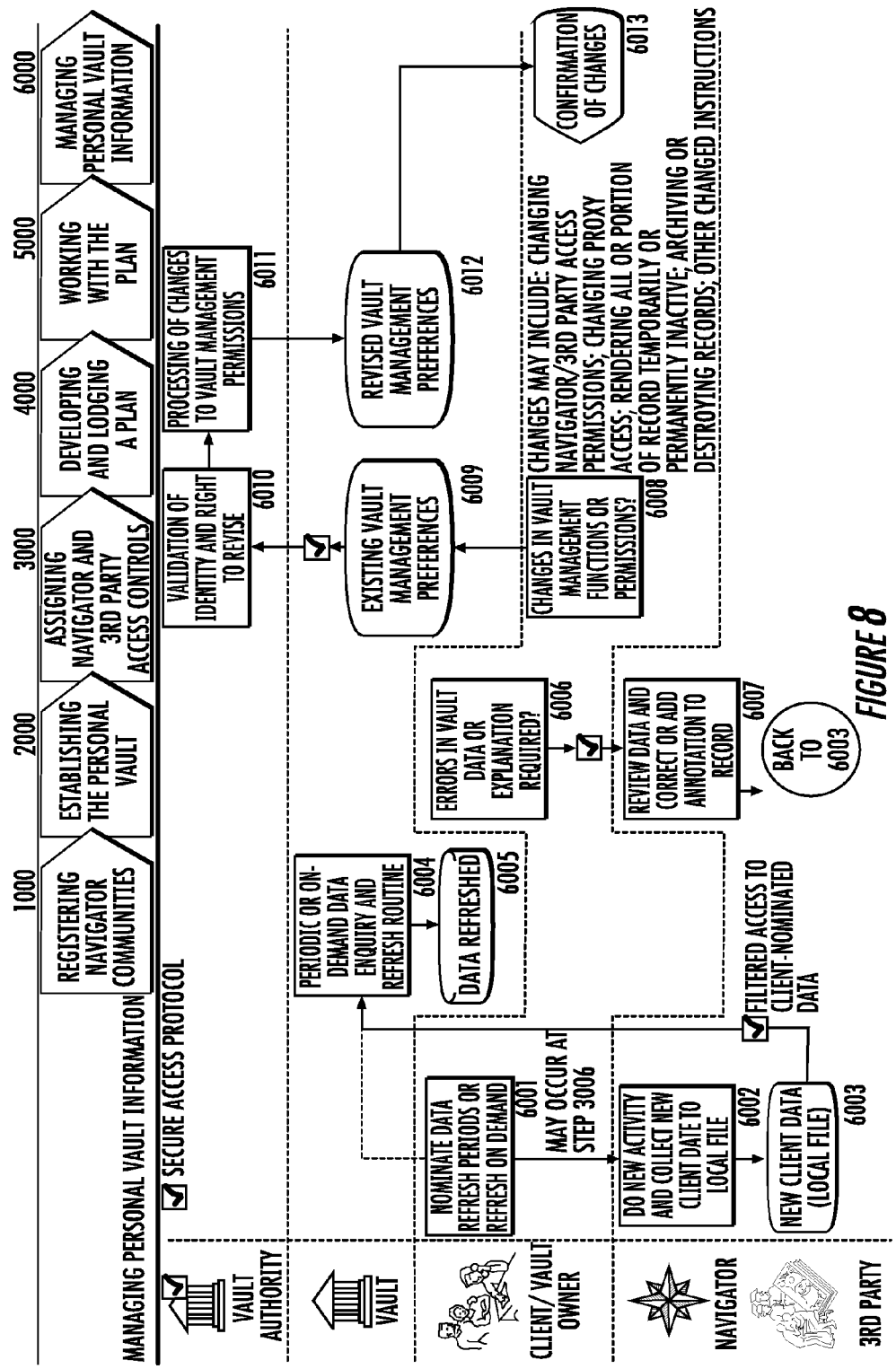
FIG. 8 depicts the flow and processing of information within the high-level process step of managing personal vault information.

FIG. 8 illustrates the remaining components of the invention not reflecting a linear client-Navigator workflow process. The steps illustrate the aspects through which all parties manage their respective interfaces with the individual's Personal Vault, including periodic and on-demand refreshment of source data, provision for correcting or annotating a record, revising Vault management permissions, and terminating or archiving records.

Steps 6001 through 6005 refer to the refreshment of data held by Navigators or third parties in their local files, into the client's Personal Vault. At Step 6001 the client nominates the data refresh periods (daily, weekly or as appropriate), or activates an "on demand" refresh routine programmed into the software. This step is likely to occur when the client establishes their vault access controls at Step 3006, or when a desired refresh period has changed. The Navigator or third party service provider does the new activity at Step 6002 and collects and enters new data to their local file, at Step 6003. The vault, responding to the nominated or on demand refresh command, enquires the Navigator or third party's local file and gains access to local client- and Navigator-nominated data.

Steps 6006 and 6007 refer to the identification of errors and their correction, and to the entry of notes to the record. At Step 6006, the client (or Navigator) identifies possible errors in their record, or seeks an explanation about details contained in their record. At Step 6007 the Navigator or third party enters the client's vault using their community key and reviews the entry. The Navigator either corrects it in their local file or enters an explanatory note to the client's vault. Where a change is made to the local record, data is refreshed through the routines described in Steps 6001 through 6005.

Steps 6008 through 6013 refer to the routine management of the record, relating to the revision of file management functions. At Step 6008, the client may wish to change an aspect of their vault management functions or permissions. The client enters their vault at Step 6009 and, referring to the main menu, selects the vault preferences function. The desired change is selected, which may relate to changing Navigator or third party access permissions, changing proxy access, rendering all or portion of record temporarily or permanently inactive, archiving or destroying records and other instructions.

The vault sends the request to the Personal Vault Authority at Step 6010, which checks the validity of the request, and if approved, processes the nominated change or instruction at Step 6011. Revisions to vault management preferences are entered to the vault at Step 6012 and confirmed to the client at Step 6013.

Figure 9:
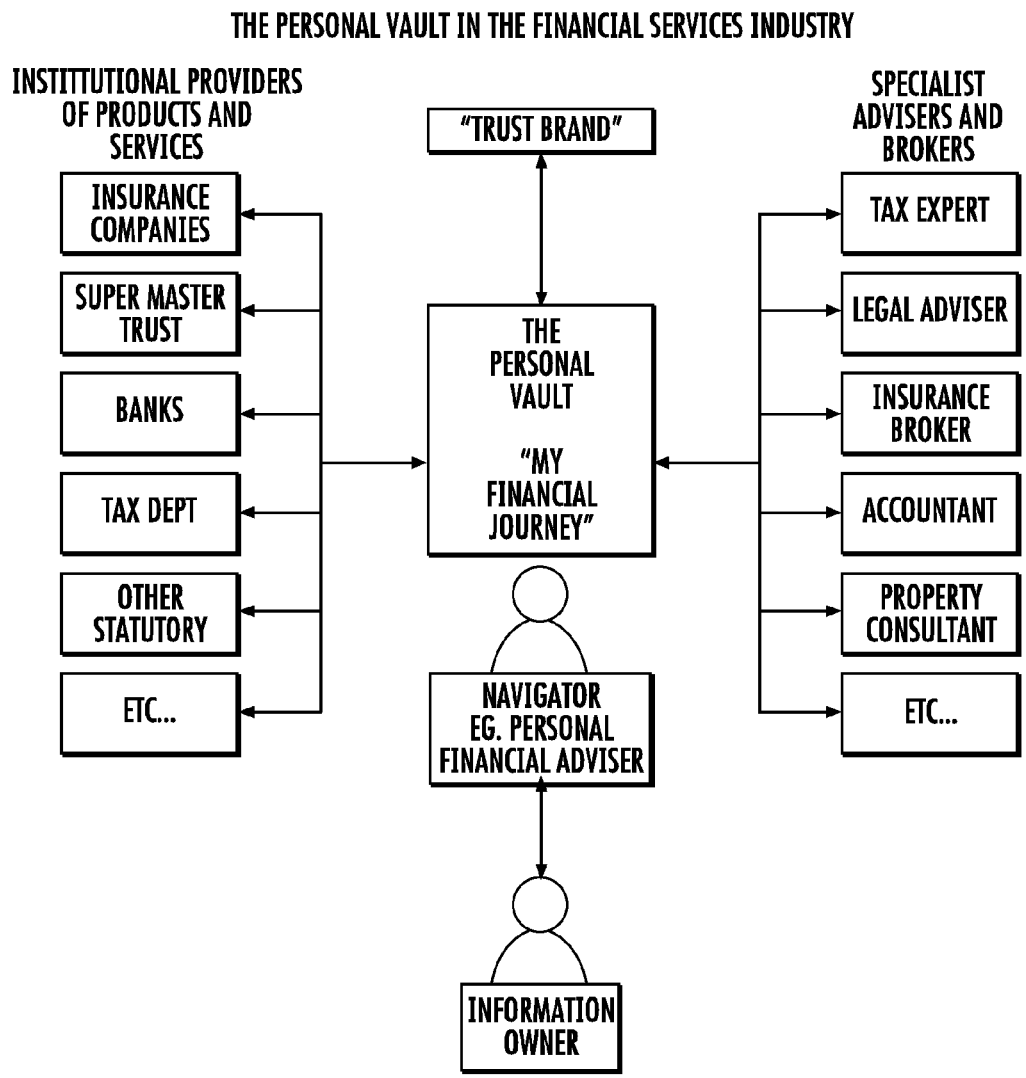
FIG. 9 illustrates an embodiment of the invention applied within the financial services industry.

FIG. 9 shows the concept of the Value Exchange as applied to a particular embodiment, in this case the Financial Services industry.

FIGS. 10 to 14 illustrate a further embodiment of the invention, in which the secure repository will be referred to as a "Personal Vault". In addition, a scenario is depicted wherein a sharing facility is established and tailored for a first user to enable second users to access their personal data. As part of this scenario, a first user is introduced to the concept of a "solutions plan" that may be effected as a result of the ability of permitted second users efficiently accessing personal data of the first user.

Figure 10:
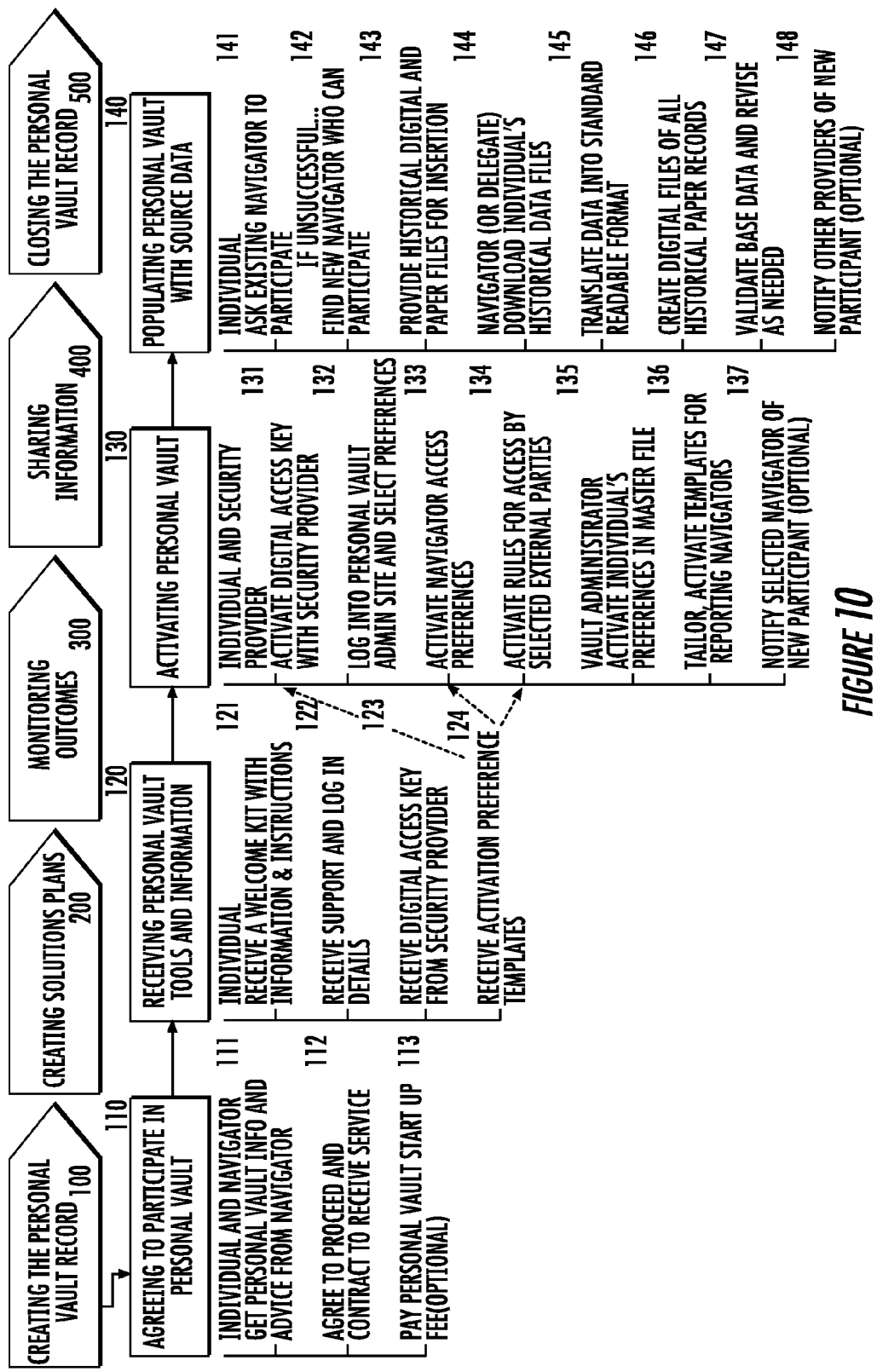
FIG. 10 is diagrammatic representation of the steps included in creating a secure repository for an embodiment of the invention.
Figure 11:
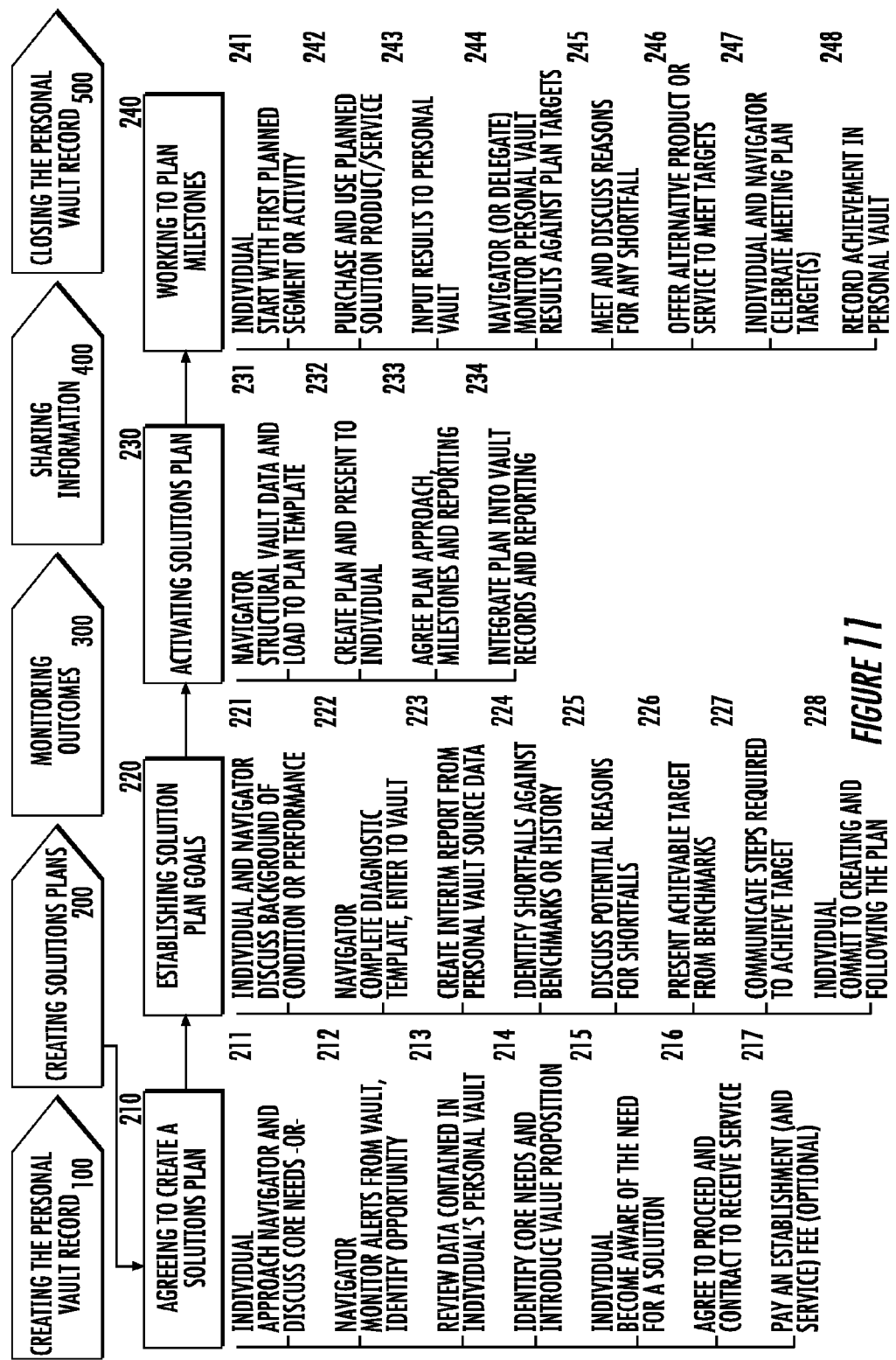
FIG. 11 is a diagrammatic representation of the steps included in creating a solution plan for the embodiment of FIG. 10.
Figure 12:
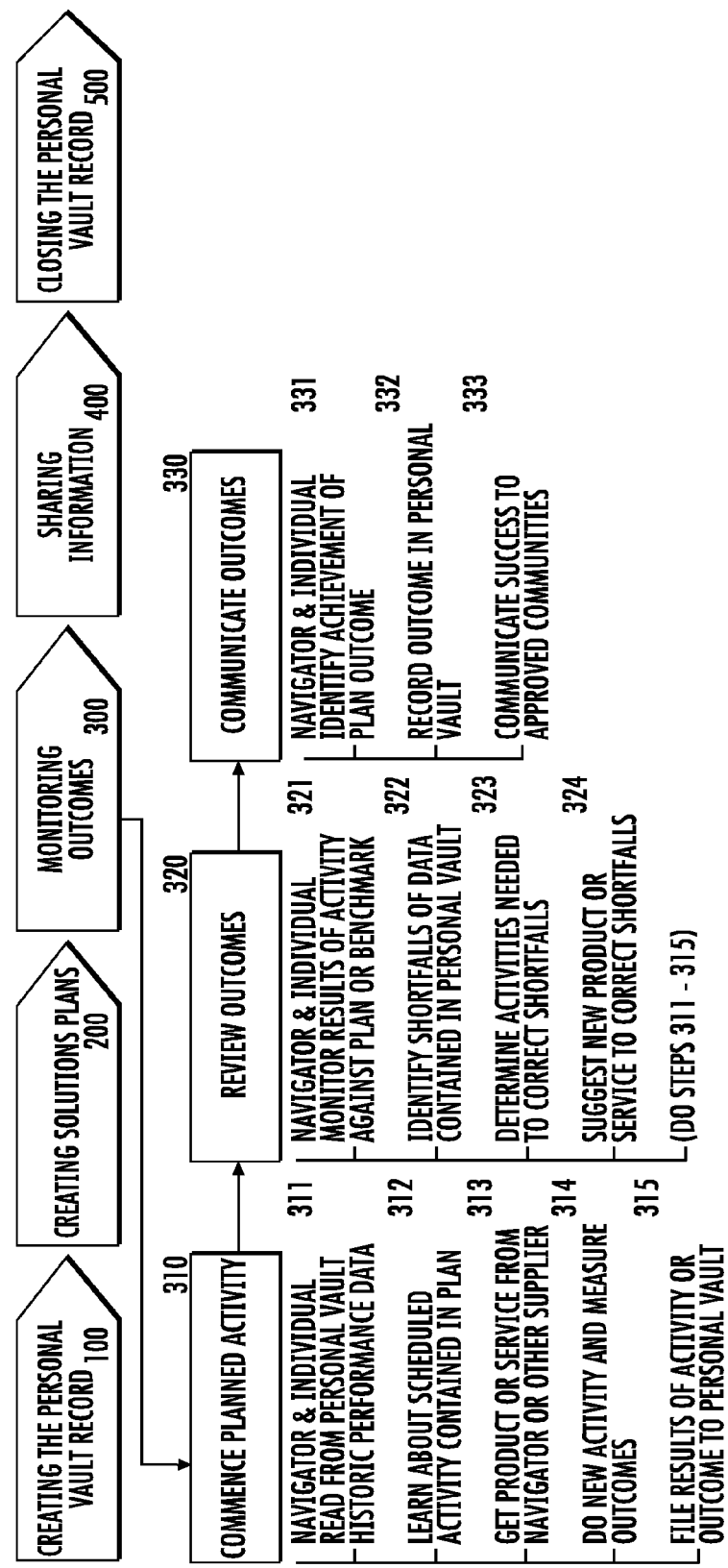
FIG. 12 is a diagrammatic representation of the steps included in monitoring outcomes for the embodiment of FIG. 10.
Figure 13:
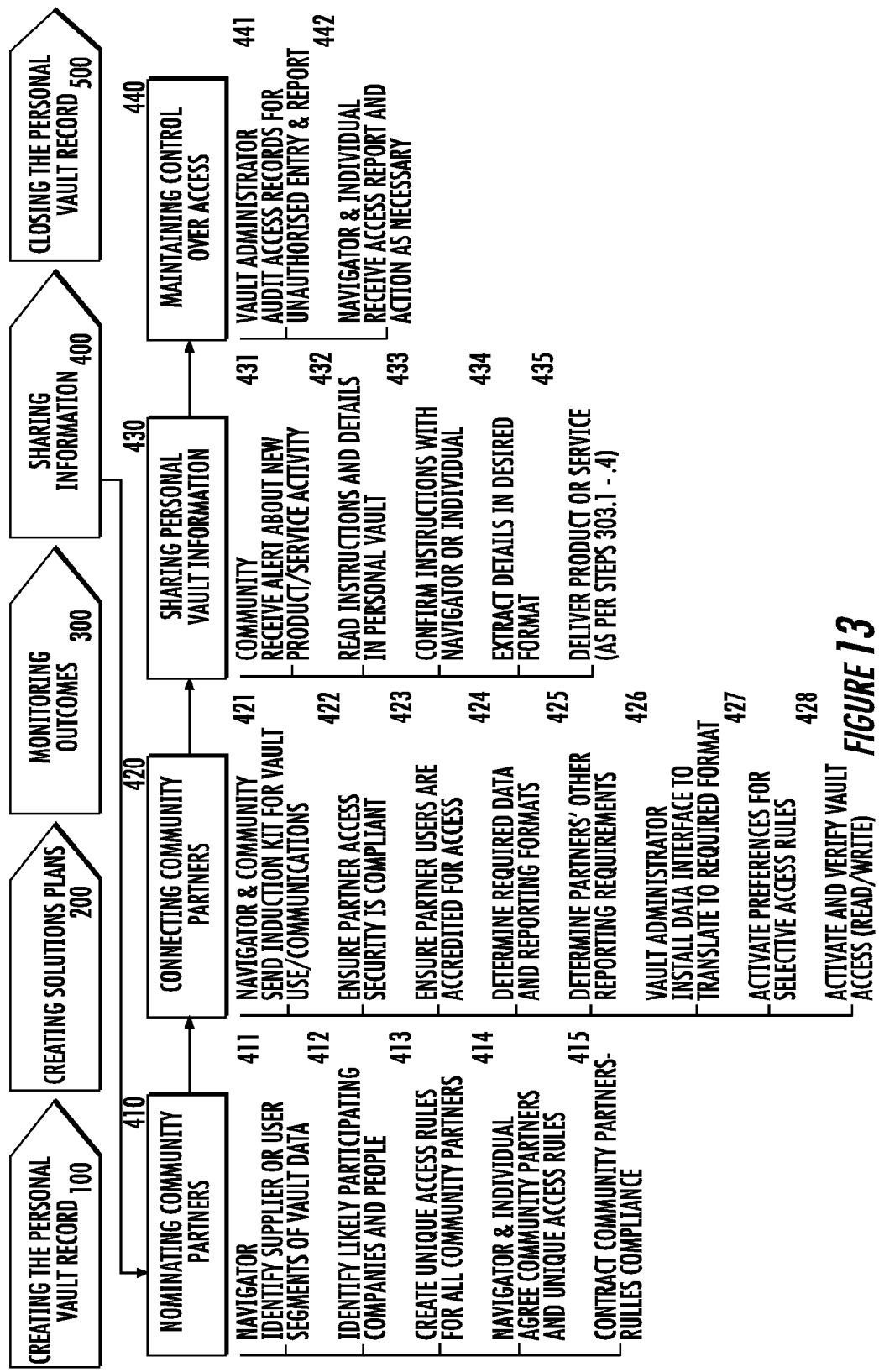
FIG. 13 is a diagrammatic representation of the steps included in sharing information for the embodiment of FIG. 10.
Figure 14:
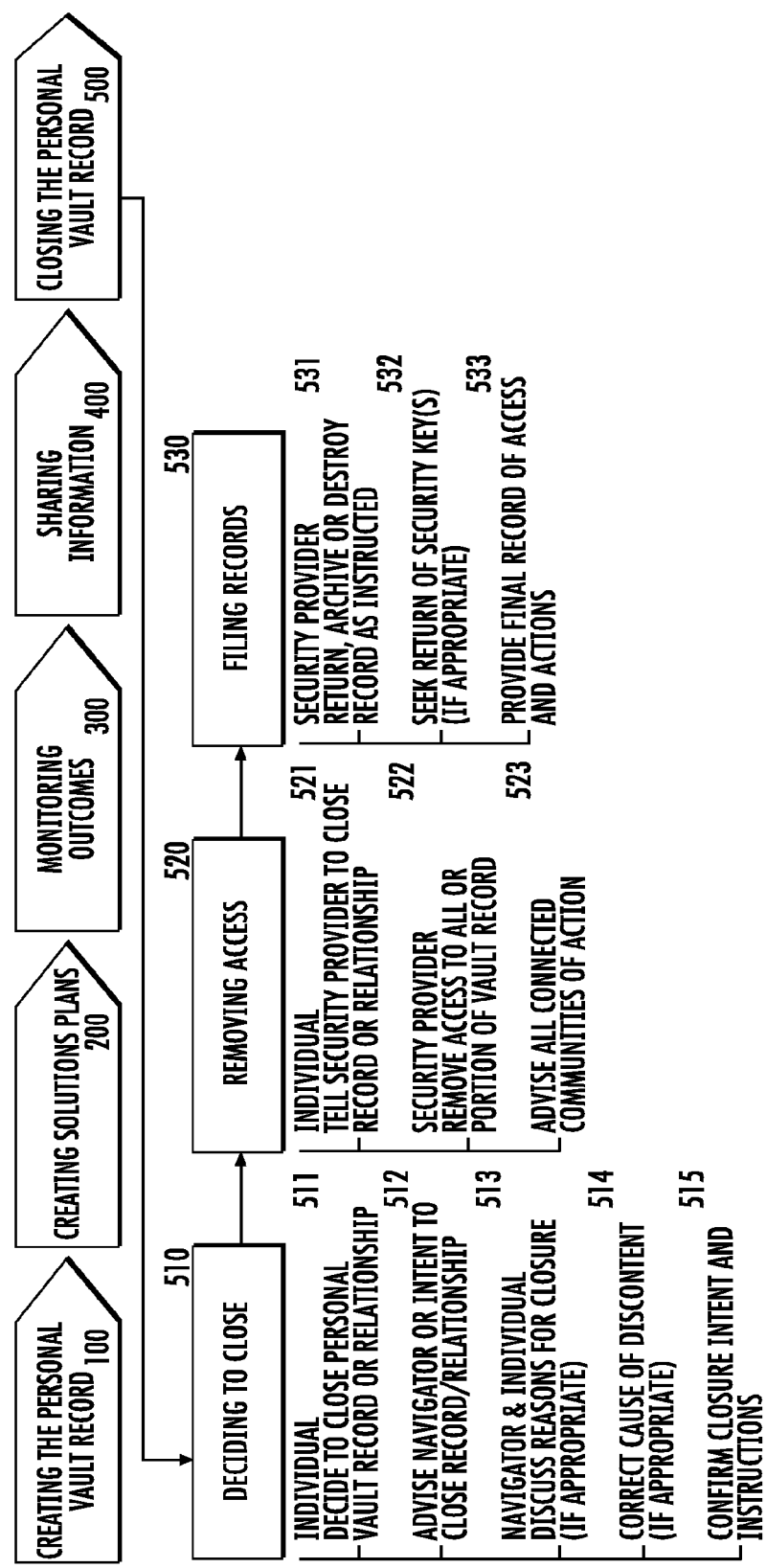
FIG. 14 is a diagrammatic representation of the steps included in closing the secure repository.

With reference to FIG. 10, a diagrammatic representation of the steps included in creating a Personal Vault is provided.

Steps 100 may be sub-divided into steps 110 to 140. At step 110, an individual agrees to participate in the Personal Vault.

It is expected that individuals will become aware of the benefits of creating a Personal Vault and using it to provide information to suppliers or other community members. This awareness is likely to occur through interaction with a professional partner such as a financial adviser, health care provider, a trusted independent source or by way of direct marketing.

Partners able to provide value-added services requiring access to personal data of an individual, for the purposes of achieving planned goals, and are referred to in this description as a "Navigator". This process is depicted as step 111 wherein an individual and their Navigator obtain information regarding the facility of a Personal Vault and the Navigator advises with respect to the benefits for the individual in arranging a Personal Vault for sharing items of their personal data.

At step 112, the individual agrees to proceed and contracts to create a Personal Vault and receive the service. Depending upon the application, this contract may be as simple as verbally providing consent for a free service to the individual, or it may involve a fee-based agreement, supported by a formal contract of activities to be performed by all parties. Due to the complexity of the services and the nature of the personal information contained in the Personal Vault, this step is likely to involve a written, formal agreement, or an online application evidenced by an authentication routine and digital signature.

At step 113, it is likely that a fee will be paid to a Personal Vault Administrator to cover the cost of maintaining records for each new participant and to provide a margin to the Administrator. Depending upon the relationship and the Personal Vault data application, this fee will either be paid by the individual for whom the Personal Vault is being created, or by the Navigator as part of their service to the individual.

Once an individual agrees to participate and enters into either an informal or formal supply agreement, the he or she will receive Personal Vault tools and information from the Administrator (or Navigator, as appropriate) as depicted at step 120. Step 121 refers to a Welcome Kit, likely to contain a welcome letter from the Personal Vault Administrator and/or Navigator. It is likely to contain further details of Personal Vault functionality and service agreements.

Along with information contained in the welcome kit will be specific instructions, depicted as step 122, for contacting the Personal Vault Administrator for installation and operational support. As part of this step, additional information may also be supplied for initializing a software program and logging on to the Personal Vault support and operations network. Operating instructions and interface templates may be provided through a secure Personal Vault administration web site.

At Step 123, a Security Provider, a separate entity from the Personal Vault Administrator, may deliver an inactivated access key, along with instructions for activation and use.

At Step 124, the individual follows the instructions to access the Administrator's secure Web site. This web site may include pre-defined templates that enable the individual to determine and select which community members may have access to their personal information. The templates may dictate what information can be provided to whom and under what circumstances. Templates may be used during subsequent activation steps.

Activity 130 relates to the steps needed to activate the individual's Personal Vault. At Step 131, the individual follows the instructions delivered by the Security Provider (Step 132) to activate the security key. This routine is envisaged to be similar to activating a PIN associated with a credit card or EFTPOS card.

At step 133, once the individual activates the Personal Vault access key, he or she may select and activate access for other users and nominate the conditions under which access will be permitted, following the instructions provided at Step 124. This activation routine may occur using the Personal Vault Administrator's secure Web site. The individual may change nominated access preferences at any time.

In step 134, the individual uses the Administrator's secure Web site to activate access rules provided for in Step 124.

In step 135, the Personal Vault Administrator activates selected preferences chosen by the individual. These selected preferences are expected to become available immediately and be recorded in a master file associated with the individual.

At Step 136, an individual may create a Personal Vault for a specific purpose, for example, to manage their personal and business finances. The initialization process will identify any intent in this regard, and will install purpose-specific templates for data capture, manipulation and reporting.

To this stage, other users have not been involved in any of the method steps and are unaware of the individual's activities in creating a Personal Vault. The Administrator may notify those other users.

Step 140 relates to the insertion of data into an individuals Personal Vault, so that the individual's data can be used to achieve intended outcomes. Step 141 ensures that a Navigator has been identified and has agreed to participate to provide a service for the individual. Whilst an intended outcome has been assumed in earlier steps, it is required at this stage prior to the execution of subsequent steps of the method. If existing professional service providers are unwilling to participate in the Personal Vault program, at Step 142 the Personal Vault Administrator may provide the individual with a directory of participating Navigators or may introduce these suppliers to the individual.

At step 143 the individual delivers historical files and records to the Navigator for insertion into the Personal Vault, where they are downloaded by Personal Vault data capture protocols into the Personal Vault at step 144.

It is expected that an individual's files will appear in a variety of digital and conventional formats. Before they can be used intelligently by the Personal Vault, the Navigator (through routines developed by the Personal Vault Administrator) may need to translate the record into a commonly readable format at Step 145. Further, before other Navigators in the community can source and use this data, it must be recognized by their systems. In the preferred embodiment, the Personal Vault Administrator ensures that the records of all potential individuals can be captured and translated, and can be communicated with all potential service providers.

Paper-based records such as a last will and testament and other legal documents may be converted for storage in a digital format by the Navigator at Step 146. The decision to include such documentation will rest with the individual.

At step 147, once all information has been downloaded and a Personal Vault file created, the individual and Navigator(s) review contents of the Personal Vault to ensure all records are present and correct. Where necessary, information may need to be re-submitted or corrected by information providers.

At Step 148, an individual may wish other community providers to know that a data file has been created and that a Personal Vault exists. Within strict constraints, as outlined in the contract of service and nominated access provisions, either the individual or the Navigator (when specifically permitted by the individual) may notify other users and service providers of the existence of the Personal Vault.

FIG. 2 is a diagrammatic representation of the steps included in creating a solution plan for an individual.

Once a Personal Vault has been created and populated with content in a commonly useable format, Navigators can begin to use the individuals personal information to perform services required by the individual. Step 200 relates to use of information residing in the Personal Vault to create a Solutions Plan and to monitor performance outcomes contained in the Personal Vault to guide the individual with respect to the achievement of milestones or completion of planned activities. Step 200 may be sub-divided into steps 210 to 234.

The Navigator and individual agree to create a solutions plan at step 210. At Step 211, the individual becomes aware, independent of the Navigator, of the need to reach a desired outcome, or of an activity that needs professional input to complete. At this stage, the individual contacts the Navigator for help. Step 212 indicates an alternative to step 211, where the individual's established Navigator (with Personal Vault access) receives an alert from a diary program that an activity will need to be completed soon, or that a value being reported in the Personal Vault has reached a predetermined value.

At this stage, the Navigator and individual agree that intervention is required, the intervention being formalized by a Solutions Plan. The complexity of the plan will be determined primarily by the sets of data required, the outputs involved and the other users to which the outputs will be delivered. At Step 213, the Navigator reviews all source data contained in the individual's Personal Vault, and at Step 214, identifies the individual's core needs and introduces value proposition(s) as to why a Solutions Plan is required.

Through contact with the Navigator, at Step 215, the individual becomes aware of the need to achieve an outcome through the creation of a solutions plan. At Step 216, the individual agrees to proceed with the plan and contracts with the Navigator to proceed. In most professional service relationships, authorization to proceed will involve payment of an establishment fee, this is depicted at Step 217. If appropriate for longer-term projects, there may also be service or progress fees payable to the Navigator.

The individual and Navigator work together at step 220 to establish goals for the solutions plan(s), drawing from information contained in the Personal Vault. Generally, at Step 221, the individual and Navigator would meet and discuss the condition or historical performance, leading up to awareness of the need for a solution. At step 222 the Navigator uses information from this discussion to enter details to a diagnostic template. At Step 223, the Navigator sources historical Personal Vault data and adds new information gained from the discussion with the individual to the diagnostic template. This will generate an interim report on the background or condition, matched against historical performance and benchmarks such as an industry's financial performance or average health indicators for the individual's age group.

At Step 224 the Navigator and individual discuss the interim report findings and identify adverse trends or shortfalls to benchmark. Once identified, at step 225 they discuss the potential reasons for any shortfalls. A key element of the planning process at this stage involves the presentation of achievable targets, derived from benchmarks (Step 226). Assuming that information is available from various Personal Vaults for various individuals in similar industries or age groups, benchmarks may be established. This assumes that the information has been shared by all the other individuals and collated and analyzed by another permitted user.

At step 227, the Navigator communicates the activities required to achieve the plan target(s). These activities are likely to be derived from industry-specific sources, and have a record of success without adverse risk to the individual.

Step 228 involves the individual understanding the Plan steps required and committing to creating and following a Solutions Plan.

The Solutions Plan is activated at step 230. This step commences at step 231, where the individual's relevant Personal Vault data is accessed and structured so that it conforms with planning templates (the template defines which items of personal data the service provider is able to access). The Personal Vault data is then loaded to the planning templates.

The planning templates may include functions that generate a formal Solutions Plan at Step 232. The Navigator presents the Plan to the individual. At Step 233, the individual agrees the Plan approach, including targeted milestones, outcomes and reporting activities. Once agreed and commenced, the Plan is deposited into the Personal Vault at Step 234.

The individual completes the Plan activities and works to its milestones in step 240.

Step 241 has the individual starting with the first planned segment or activity contained in the Plan.

At step 242, the individual purchases and uses the product or service suggested in the Plan, that is proposed to achieve the milestone.

At Step 243 the individual inputs the results of using the product or service into their Personal Vault, either indicating measurable results or subjective observations about progress.

At Step 244, the Navigator or other nominated representative monitors the results being indicated in the individual's Personal Vault against Plan targets.

At Step 245, where there are shortfalls to any planned target, the Navigator or delegate meets with the individual and discusses the reasons for any shortfall. During this time, at Step 246, the Navigator offers alternative products or services that may meet the objective, if it is agreed the earlier course will not meet the goal.

At 247, and assuming the individual meets their planned goal, the individual and Navigator celebrate the achievement. The scale of this activity will be commensurate with the effort taken and value of the relationship.

At 248, the Navigator records the achievement of the Plan outcome in the individual's Personal Vault.

Step 300 relates to the monitoring of a solution plan and other outcomes indicated in the Personal Vault. Step 300 may be sub-divided into steps 310 to 333.

Step 310 includes the steps for working to Plan milestones. At Step 311, the individual commences with the first planned segment or activity. This will generally involve direct counseling with the Navigator, at step 312, but may be described in written or other instructions contained in the Plan.

In retail environments, the plan activities may involve the purchase of products or services that support achievement of the objective. In this instance, the individual may purchase and use products or services at Step 313. The individual will then complete or practice activities as outlined in the Plan at Step 314, using the products or services purchased in the previous step.

During the course of using the product or service purchased, or completing the planned activity, in Step 315 the individual inputs data to their Personal Vault. Where there is regular communication with the Navigator during the process, the Navigator may post the results.

Step 320 involves the Navigator monitoring the individual's results and correcting shortfalls to reach the target. While the individual is completing Plan activities, the Navigator will monitor progress toward outcomes through the individual's Personal Vault (step 321). The Navigator may diarize regular access, or may be requested to do so by the individual. There may even be an alert that automatically appears in the Navigator's system when a positive or negative performance threshold is reached.

At regular intervals, the Navigator will meet with the individual to discuss progress and to identify the reasons for any shortfall (Step 322). If products or services acquired as part of the plan have not helped to achieve planned milestones, at Step 323 the Navigator may suggest alternative activities. This may involve an offer of new products or services for purchase, either through the Navigator or through another source (step 324). The plan completion activities outlined from Step 311 through 324 are repeated until a satisfactory outcome is achieved.

Step 330 involves the communication of either success or failure to meet the target. Ideally, at Step 331, the Navigator identifies the achievement of the interim or complete Plan outcome. Regardless of success or failure, both the individual and Navigator may record details relating to the completion of the Plan in the individual's Personal Vault in Step 332. Where appropriate, the individuals success is communicated to them at Step 333 and potentially, the result may be communicated to other interested parties within a community permitted to receive such communications.

Step 400 relates to the sharing aspects of the individuals personal data in the Personal Vault. Step 400 may be sub-divided into steps 410 to 442. Step 410 involves the nomination of other users or community partners to gain access to the individual's Personal Vault and personal information.

At Step 411, the Navigator identifies potential suppliers or users of the individual's Personal Vault data. If the individual is a small business owner and the Navigator is his or her Accountant, potential suppliers may include banks, investment brokers, insurers, superannuation providers and others in the financial services industry.

Once a class of suppliers or users have been identified, the Navigator may work with the individual to nominate partner companies and people within each company at Step 412.

At Step 413, the Navigator will create or work from a standard template indicating a range of access rules by which other users will be able to access the data in an individual's Personal Vault. It is most likely that data access templates will be constructed by the Personal Vault provider and industry authorities.

Once a template has been developed, at Step 414, the individual nominates selected access preferences. This is completed by way of a secure electronic form, transmitted to the Navigator, Personal Vault authority and Security Provider.

In some instances, community partners may need to enter into supply contracts in Step 415, committing to comply with rules of access.

At step 420, community partners are connected to the individual's Personal Vault. At Step 421 the Navigator (or Personal Vault authority) may send an Induction Kit to nominated community members, if the member is unaware of the program. The Kit will be similar to that sent to the individual at Step 121, but tailored to the community member, and will likely contain an inactivated security key offering a higher level of authentication than the individual's key.

At Step 422, the Navigator (or Security Administrator) ensures that the community member's access security is compliant with that of the Personal Vault to ensure that access to the individual's records is performed in a secure manner. In addition to this, the Navigator (or Security Administrator) will ensure at Step 423 that the users have been nominated, and have received and can follow secure access routines, and use the security key correctly. This will be demonstrated by receiving accreditation for access to the Personal Vault.

At Step 424, community partners will determine the required data and reporting formats in which to obtain data from, and supply data to, the Personal Vault. The Navigator will also discuss and action any other partner reporting requirements at Step 425.

Upon completion of step 425, the Personal Vault Administrator is ready to activate the partner connection. The Administrator may install an industry-specific data interface to translate Personal Vault data to the required reporting format at Step 426. Working from selected preferences identified at Step 413, the Administrator will also activate preferences for selective access rules at Step 427. Finally, the Administrator will activate and verify access by the nominated community member to the individual's nominated fields in the Personal Vault (Step 428).

Once installed, community members can access and share nominated Personal Vault data as depicted in step 430. This step is likely to commence at Step 431, with a community member receiving an online alert or other notification that a Navigator or individual wishes to receive a product or service. The Navigator or individual may have included details or other instructions regarding the request in a Personal Vault information field. The information field may contain one or more items of personal data of an individual. If so, the community member accesses the Personal Vault and views the notes at Step 433.

At Step 434, the community member extracts the data they require from the Personal Vault. The data will be communicated in the desired format, in accordance with the templates established earlier at Step 426. At Step 435, the community member will then use the personal data of the individual to deliver the product or service as contracted in Step 415.

It is important to maintain control with respect to community access to the individual's personal data as depicted at step 440. At Step 441 the Security Provider audits access records for unauthorized entry and takes action with respect to any unauthorized attempt to access the personal data of an individual. The Security Provider sends a regular report to the Navigator and individual, as contracted, in Step 442.

Step 500 of the method relates to the closing of a Personal Vault and the handling of the personal data in a secure manner.

In Activity 511, the individual decides to close their Personal Vault record. This may be instigated by an individual, or may be instigated by a custodian who closes the record on an owner's behalf (such as in the event of death).

At Step 512, the individual (or custodian) advises the Navigator of the intent to close the record. If appropriate, the Navigator may determine the reason for the closure and seek to correct any shortcoming (513 and 514). If the individual still wishes to close the Personal Vault record, he or she confirms their intent and provides instructions for closure at Step 515.

Activity 520 details the steps for removing access. At 521, the individual informs the Security Provider (preferably in writing) to close the record. At 522, the Security Provider removes access to all, or part of, the individual's record in accordance with the instructions. The Security Provider advises, at Step 523, all relevant connected communities affected by the closure of the record.

The Personal Vault records are filed or destroyed following the individual's instructions at Activity 530. At Step 531, the Security Provider returns, archives or destroys the record as instructed. Subsequent to, or concurrent with this action, at Step 532, the Security Provider seeks return of all security keys from the individual and from any connected parties, if necessary. The activity ends at 533 with confirmation by the Security Provider of the action, providing a final report of closure to the individual.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A computer implemented method for providing advice or service to a consumer using one or more processors that are adapted to execute instruction code, the method comprising:

storing personal data provided by the consumer in a secure repository that is designated for the consumer and that is connected to a data communications network;

storing at least one segment of at least one of an advice instruction code or a service computer instruction code in the consumer-designated secure repository;

receiving access authentication from at least one of an advice provider, a service provider, a class of advice providers or a class of service providers;

authorizing access to the at least one segment of at least one of an advice instruction code or a service computer instruction code across the data communications network to the at least one of an advice provider, a service provider, a class of advice providers or a class of service providers, executing within the secure repository the at least one segment of at least one of an advice instruction code or a service computer instruction code in response to input from the at least one of an advice provider, a service provider, a class of advice providers or a class of service providers;

storing results from executing the at least one segment of at least one of an advice instruction code or a service computer instruction code by the at least one of an advice provider, a service provider, a class of advice providers or a class of service providers in the consumer-designated secure repository; and providing the consumer with access to the results stored in the consumer-designated secure repository.

2. The method according to claim 1 further comprising:

allowing the consumer to alter authorization previously provided to the at least one of an advice provider, a service provider, a class of advice providers or a class of service providers.

3. A computer implemented system for providing advice or service to a consumer, the system comprising:

a secure repository, that is designated for the consumer and that is connected to a data communications network, for storage of items of personal data of the consumer, wherein the secure repository is configured to execute computer-readable program code to:

store at least one segment of advice instruction code or service computer instruction code in the consumer-designated secure repository, and provide identification of a particular advice provider, service provider, class of advice providers or class of service providers to the consumer, such that the consumer may select to whom access to the at least one segment of advice instruction code or service computer instruction code is provided; and a processing device that is configured to execute computer-readable program code to:

authenticate the identity of at least one authorized advice provider or service provider;

provide an authenticated authorized advice provider or service provider access to execute within the secure repository the at least one segment of advice instruction code or service computer instruction code, wherein operation of the at least one segment of advice instruction code or service computer instruction code include specified items of personal data in the secure repository and provide results of the operations to the authenticated authorized advice provider or service provider; and allow the authenticated authorized advice provider or service provider to deposit results in the secure repository for subsequent access by the consumer.

4. A computer implemented system according to claim 3 wherein providing identification of a particular advice provider, service provider, class of advice provider or class of or service providers to the consumer, such that the consumer may select to whom access to the at least one segment of computer instruction code is provided, further comprises:

a processing device operably connected to the data communications network and adapted to execute computer instruction code to:

display available advice providers or service providers to the consumer; and provide a selection means for the consumer to select the available advice providers or service providers from the available advice providers or service providers.

5. A computer implemented system according to claim 3 wherein authenticating the identity of one or more authorized advice providers or service providers, further comprises a processing device operably connected to the secure repository and configured to receive authentication information from one advice provider or service provider, among the one or more authorized advice providers or service providers, via the data communications network; to confirm the identity of the one or more authorized advice providers or service providers using authentication information.

6. A computer implemented system according to claim 5 wherein the processing device executes computer instruction code comprising a web browser, wherein the executed computer instruction code allows the processing device to communicate with the secure repository across the data communications network in accordance with world wide web protocols.

7. A computer implemented system according to claim 3 wherein the items of personal data of the consumer stored in the secure repository are selected from the group consisting of at least one of the following:

accounting records;
financial records;
health records;
insurance records;
estate records;
values of the consumer;
attitudes of the consumer;
personal goals of the consumer; and
preferred outcomes of the consumer.

8. A computer implemented system according to claim 3 wherein proving identification of a particular advice provider, service provider, class of advice providers or class of service providers to the consumer, such that the consumer may select to whom access to the at least one segment of advice instruction code or service computer instruction code is provided allows the consumer to alter the access to the at least one segment of the advice instruction code or service computer instruction code.

9. A computer implemented system according to claim 3 wherein providing the authenticated authorized advice adviser or service provider access to execute the at least one segment of advice instruction code or service computer instruction code further comprises a processing device configured to execute computer instruction code that identifies the at least one segment of advice instruction code or service computer instruction code for which the authenticated authorized advice provider or service provider has been granted access, the processing device being operably connected to the data communications network.

10. A computer implemented system according to claim 3 wherein the secure repository includes a processing device configured to execute computer instruction code to operate a database function, the processing device includes additional computer instruction code operable to perform functions on items of personal data belonging to consumers wherein the functions generate results that are transmitted to the authenticated authorized advice provider or service provider.

11. A computer implemented method for a consumer to receive advice or service, the method being executed by one or more processors executing instruction code, the method comprising:

storing personal data in a consumer-designated section of a secure repository, which is connected to a data communications network;

approving at least one segment of advice instruction code or service computer instruction code for execution to perform operations in respect of a consumer's personal data file by receiving authorization from the consumer to store the at least one segment of advice instruction code or service computer instruction code in the consumer-designated section of the secure repository;

authorizing access to the at least one segment of advice instruction code or service computer instruction code across the data communication network to at least one advice provider, service provider, class of advice providers or class of service providers, to execute the at least one segment of advice instruction code or service computer instruction code and to store results in the consumer-designated section of the secure repository;

allowing access to the consumer-designated section of the secure repository to the at least one advice provider, service provider, class of advice providers or class of service providers, wherein the consumer-designated section of the secure repository accessed include designated sections relating to advice or service that are provided by the at least one advice provider, service provider, class of advice providers or class of service providers receiving access; and executing within the secure repository the at least one segment of advice instruction code or service computer instruction code in response to input from the at least one advice provider, service provider, class of advice providers or class of service providers.

12. A method according to claim 11 wherein the personal data comprises data representing at least one of the following:
values or attitudes of the consumer;
personal goals that the consumer intends to achieve in a specified period of time;
preferred outcomes for the consumer over a specified period of time; and
a prioritized listing of any one or more of values or attitudes of the consumer, personal goals that the consumer intends to achieve in a specified period of time, and preferred outcomes of the consumer over a specified period of time.

13. A method according to claim 11 further comprising storing and designating consumer computer instruction code, through the use of a processor, in the consumer-designated section of the secure repository that is to be accessible to at least one other consumer.

14. A computer implemented method according to claim 13 wherein the consumer computer instruction code is allowed to be configured by the consumer to provide access to the consumer-designated section of the secure repository to at least one other consumer.

15. A method according to claim 11 further comprising storing and designating consumer computer instruction code, through the use of a processor, in the consumer-designated section of the secure repository that is to be accessible to at least one class of consumers.

16. A computer implemented method according to claim 15 wherein the consumer computer instruction code is allowed to be configured by the consumer to provide to the consumer-designated section of the secure repository to at least one class of consumers.

17. A method according to claim 11 further comprising instructions for:
one or more processors executing instruction code that records instances of access to items of personal data in the secure repository.

18. A computer implemented method according to claim 11 further comprising:
providing the consumer an ability to alter authority of the authorized advice provider or service provider.

19. A computer implemented method according to claim 11 further providing a result to an advice provider or service provider without revealing underlying personal items of data.

20. A computer readable medium having computer instruction code for performing a method of providing advice or service to a consumer embedded thereon, the computer instruction code being executable by a processor and comprising instructions for:
receiving a request from the consumer to store personal data in a consumer-designated section of a secure repository that is connected to a data communications network;
receiving details from the consumer of at least one advice provider, service provider, class of advice providers or class of service providers authorized to provide advice or services to the consumer;
receiving a request from the consumer to store a segment of advice instruction code or service computer instruction code in the consumer-designated section of the secure repository;
receiving a request from an authorized advice provider or service provider to access the segment of advice instruction code or service computer instruction code in the consumer-designated section of the secure repository upon provision of necessary authentication, the authorized advice provider or service provider executing within the secure repository the segment of advice instruction code or service computer instruction code in response to input from the at least one advice provider, service provider, class of advice providers or class of service providers, in the consumer-designated section of the secure repository and depositing results into to the consumer-designated section of the secure repository, wherein the results represent advice or service provided to the consumer; and
receiving a request from the consumer to access the results deposited into the consumer-designated section of the secure repository.

21. A computer readable medium according to claim 20, further comprising instructions for:
receiving a request from the authorized advice provider or service provider to access information relating to advice or service previously deposited by another advice provider or service provider into the consumer-designated section of the secure repository; and
allowing the authorized advice provider or service provider to access the information previously deposited by the other advice provider or service provider if permitted to do so.

22. A computer readable medium according to claim 21, further comprising instructions for:
receiving details from the consumer specifying which of the information previously deposited is to be accessible by the authorized advice or service provider.

23. A computer readable medium according to claim 20, wherein the personal data comprises data selected from the group consisting of at least one of the following:
an indication of values or attitudes of the consumer;
an indication of at least one personal goal that the consumer intends to achieve over a specified period of time;
an indication of preferred outcomes of the consumer over a specified period of time; and
an indication of a priority of any one of the values or attitudes of the consumer, the at least one personal goal that the consumer intends to achieve in a specified period of time, and the preferred outcomes over a specified period of time.

24. A computer readable medium according to claim 20, further comprising instructions for at least one of the following:

recording instances of access to items of the personal data in the consumer-designated section of the secure repository;

recording instances of depositing information in the consumer-designated section of the secure repository; and recording instances of changes to the items of the personal data in the consumer-designated section of the secure repository.

25. A computer readable medium according to claim 20, further comprising instructions for:

receiving details from the consumer regarding storing and designating consumer computer instruction code in the consumer-designated section of the secure repository that is to be accessible to at least one other consumer.

26. A computer readable medium according to claim 25 further comprising:

allowing the consumer computer instruction code to be configured by the consumer to provide access to items of the in the consumer-designated sections of the secure repository to the at least one other consumer.

27. A computer readable medium according to claim 20, further comprising instructions for:

receiving details from the consumer regarding storing and designating consumer computer instruction code in the consumer-designated section of the secure repository that is accessible to at least one class of consumers.

28. A computer readable medium according to claim 27 further comprising:

allowing the consumer to configure the consumer computer instruction code to provide access to the consumer-designated sections of the secure repository to at least one other class of consumers.

29. A computer readable medium according to claim 20, further comprising instructions for:

receiving, from the consumer, details of at least one advice provider, service provider, class of advice providers or class of service provider for whom authority is to be altered.

* * * * *